United States Patent
Erb et al.

(10) Patent No.: US 10,052,824 B2
(45) Date of Patent: Aug. 21, 2018

(54) SYSTEMS, DEVICES, AND METHODS FOR THREE-DIMENSIONAL PRINTING

(71) Applicant: Massachusetts Institute of Technology, Cambridge, MA (US)

(72) Inventors: Dylan C. Erb, O'Fallon, IL (US); Joshua E. Siegel, Bloomfield Hills, MI (US); Isaac M. Ehrenberg, Brookline, MA (US); Pranay Jain, Delhi (IN)

(73) Assignee: Massachusetts Institute of Technology, Cambridge, MA (US)

( * ) Notice: Subject to any disclaimer, the term of this patent is extended or adjusted under 35 U.S.C. 154(b) by 465 days.

(21) Appl. No.: 14/711,213

(22) Filed: May 13, 2015

(65) Prior Publication Data

US 2015/0328838 A1 Nov. 19, 2015

Related U.S. Application Data

(60) Provisional application No. 61/992,282, filed on May 13, 2014.

(51) Int. Cl.
  *B29C 64/10* (2017.01)
  *B29C 67/00* (2017.01)
  (Continued)

(52) U.S. Cl.
  CPC .......... *B29C 67/0088* (2013.01); *B29C 64/10* (2017.08); *B29C 64/393* (2017.08);
  (Continued)

(58) Field of Classification Search
  CPC ..... B29C 64/20; B29C 64/295; B29C 64/106; B29C 64/118; B29C 47/30; B33Y 10/00; B33Y 30/00; B33Y 70/00
  See application file for complete search history.

(56) References Cited

U.S. PATENT DOCUMENTS 2,487,910 A * 11/1949 Waddell .................. B29C 47/30
                                                    100/906
3,252,181 A *  5/1966 Hureau ............... B29C 47/0033
                                                    156/500
(Continued)

FOREIGN PATENT DOCUMENTS

EP    1262305 A2   12/2002
WO  2008/151063 A2  12/2008

OTHER PUBLICATIONS

Conner-Simons, A., "'Multi-Fab' 3-D Prints a Record 10 Materials at Once, No Assembly Required," MIT News, Aug. 24, 2015, https://news.mit.edu/2015/multifab-3-d print-10-materials-0824 (8 pages).

(Continued)

*Primary Examiner* — Matthew J Daniels
*Assistant Examiner* — Andrew D Graham
(74) *Attorney, Agent, or Firm* — Nutter McClennen & Fish LLP

(57) ABSTRACT

Systems, devices, and methods for three-dimensional printing are provided. The systems, devices, and methods provide for high throughput printing by allowing for parallel extrusion within a single vertical layer of the printed object, i.e., parallel extrusion within an x-y coordinate plane. Any advancement of an extruder can be limited to movement along a single axis, or even no axis at all, so that printing occurs more quickly. In some embodiments, the extruder can include a printing plate that includes a plurality of apertures defined by conductive elements extending in a grid-like manner. The printer can be designed such that material is disposed to a build platform through the apertures only when the aperture is heated on all four sides, for instance by running current through the conductive elements that define (Continued)

the aperture. Other systems, devices, and methods for three-dimensional printing are also provided.

25 Claims, 17 Drawing Sheets

(51) Int. Cl.
    *B33Y 50/02*     (2015.01)
    *B29C 64/393*     (2017.01)
    *B33Y 10/00*     (2015.01)
    *B33Y 30/00*     (2015.01)
    *G05B 15/02*     (2006.01)

(52) U.S. Cl.
    CPC ...... *B29C 67/0059* (2013.01); *B29C 67/0085* (2013.01); *B33Y 10/00* (2014.12); *B33Y 30/00* (2014.12); *B33Y 50/02* (2014.12); *G05B 15/02* (2013.01)

(56) References Cited

U.S. PATENT DOCUMENTS

| | | | | |
|---|---|---|---|---|
| 3,656,428 A * | 4/1972 | Duncan | ............ | B41F 15/00 101/126 |
| 4,373,441 A * | 2/1983 | Messerschmitt | ........ | B41F 15/36 101/127.1 |
| 4,398,462 A * | 8/1983 | Okano | ............ | B41C 1/14 101/127 |
| 5,121,329 A * | 6/1992 | Crump | ............ | B22F 3/115 228/180.5 |
| 6,054,077 A * | 4/2000 | Comb | ............ | B29C 47/92 264/40.7 |
| 7,032,987 B2 * | 4/2006 | Bhattacharjya | ...... | B41J 2/04505 347/12 |
| 7,568,777 B2 * | 8/2009 | Clark | ............ | B41J 2/04543 347/14 |
| 2004/0003738 A1 | 1/2004 | Imiolek et al. | | |
| 2008/0309728 A1 | 12/2008 | McAvoy et al. | | |
| 2010/0021638 A1 * | 1/2010 | Varanka | ............ | B33Y 10/00 427/271 |
| 2010/0140852 A1 * | 6/2010 | Kritchman | ............ | B33Y 30/00 264/494 |
| 2012/0156516 A1 * | 6/2012 | Matsui | ............ | B29C 64/165 428/515 |
| 2013/0141491 A1 * | 6/2013 | Krichtman | ............ | B41J 2/16526 347/30 |
| 2013/0189435 A1 | 7/2013 | Mackie et al. | | |
| 2014/0036455 A1 * | 2/2014 | Napadensky | ....... | B29C 67/0059 361/748 |
| 2014/0117575 A1 | 5/2014 | Kemperle et al. | | |
| 2015/0224709 A1 * | 8/2015 | Napadensky | ......... | B29C 64/245 264/308 |
| 2015/0273769 A1 * | 10/2015 | Korn | ............ | B29C 67/0088 264/405 |
| 2016/0361868 A1 * | 12/2016 | Wang | ............ | B29C 70/545 |

OTHER PUBLICATIONS

International Search Report and Written Opinion for Application No. PCT/US2015/030549, dated Aug. 19, 2015. (17 pages).
Tumbleston, et al., "Continuous liquid interface production of 3D objects," Science (2015), vol. 347, No. 6228, pp. 1349-1352.

\* cited by examiner

SYSTEMS, DEVICES, AND METHODS FOR THREE-DIMENSIONAL PRINTING

CROSS REFERENCE TO RELATED APPLICATION

The present disclosure claims priority to U.S. Provisional Application No. 61/992,282, entitled "Local Viscosity Control Additive Manufacturing Technology," which was filed on May 13, 2014, and which is incorporated by reference herein in its entirety.

FIELD

The present disclosure relates to systems, devices, and methods for three-dimensional printing, and more particularly relates to using local viscosity control to print at multiple selected locations in a layer simultaneously or near simultaneously.

BACKGROUND

Fused Deposition Modeling (FDM®), FDM being a registered trademark of Stratasys, Inc., is a common three-dimensional printing technique used to print in a variety of settings. It is also referred to as Fused Filament Fabrication (FFF). The technique involves printing a three-dimensional object, layer by layer. A print head having an extrusion nozzle travels within an x-y coordinate plate to individually extrude small beads of material, such as thermoplastic, at individual locations within the plane. The extruded beads then harden and solidify. The material can be supplied to the print head in a number of manners, but in some instances a plastic filament or metal wire is unwound from a coil and supplied to the extrusion nozzle, which in turn extrudes the material at a single point within the layer. After the print head travels to each printing location with the x-y coordinate plane so that each bead is printed and hardens to form a layer of the printed object, another layer is printed above the previous layer. Printing of the second layer is done in a similar manner, with the print head traveling within an x-y coordinate plane that is disposed vertically above the previous layer to individually extrude small beads of material at individual locations within the plane. This technique continues, layer-by-layer, until the three-dimensional object is complete.

While FDM is a popular way to print three-dimensionally, it suffers from a number of deficiencies. For example, printing an object using FDM is a very slow process, making it unsuitable for printing large structures. The very nature of the physics associated with FDM makes it slow. Moving the print head to each individual location within a layer to print takes time and energy, and requires a complex and costly machine design. Alternatively, moving a build platform on which the printing occurs to a stationary print head takes a long time and a large amount of energy to perform a single print job. Those skilled in the art recognize that it is a rate-limited printing process, and thus its use is often limited to slow-turn components and low volume production. The process also requires a large amount of energy. For example, when a print head has multiple nozzles, each nozzle is typically individually, directly controlled, which means that the number of actuators (n) involved is $n^2$, complicating control circuitry design and requiring high power dissipation. These separate extrusion mechanisms must all have associated mechanical constraints and controls. Still further, the properties of the materials used typically in FDM, in light of the technique itself, also contributes to the slow nature of the printing technique. Another common three-dimensional printing technique, stereolithography (SLA), also currently suffers from deficiencies, including its speed (even in its digital light processing, or DLP, form), and the limited types of material that can be used to print using this technique.

Accordingly, it is desirable for three-dimensional printing systems, devices, and methods to allow for a higher throughput, at least in some applications, even at the expense of quality, at least to some degree. Such systems, devices, and methods could be used in a home or office setting, and/or for prototyping. For example, systems, devices, and methods that allow for furniture and car dashboards to be printed in a faster manner than when printed using FDM is desirable.

SUMMARY

Systems, devices, and methods are generally provided for three-dimensional printing. More particularly, the present disclosure is directed to a technique referred to herein as local viscosity control, which allows three-dimensional printing to occur at a rate much faster than traditional three-dimensional printing. In view of the systems, devices, and methods provided for herein that use local viscosity control, a layer of a three-dimensional objected can be printed by having simultaneous or near simultaneous material deposition at multiple locations within an x-y coordinate plane. The three-dimensional object is then built by printing in this parallel or near parallel manner for each layer, with each layer being stacked on top of another along a z-axis. As described in greater detail herein, in some exemplary embodiments the systems, devices, and methods allow a printing plate having a plurality of apertures formed therein to have a material (e.g., a thermoplastic) passed through multiple selected locations of the apertures at or close to the same time. The material can be heated directly at the selected locations by applying heat to the material or by applying heat to a portion of the plate at which the selected location is disposed, thus causing the material to heat to a hot enough temperature that it can pass through the aperture of the printing plate. The material can pass through the aperture because at least one of reduced viscosity and a resultant increased flow, or through wicking and contact forces or capillary action. In other embodiments, convective or radiative heat transfer can pass the material through the aperture. However the material is passed through the plate, the result is systems, devices, and methods that offer a throughput that is orders of magnitude greater than traditional three-dimensional printing techniques.

In one exemplary embodiment, a method for printing in three dimensions includes printing a first layer by near simultaneously depositing material in a plurality of locations within an x-y coordinate plane of a first vertical level, and printing a second layer by near simultaneously depositing material in a plurality of locations within an x-y coordinate plane of a second vertical level, with the second layer being disposed vertically above or below the first layer.

Printing a first layer can include controlling at least one of a viscosity of material and a temperature of material that is deposited such that the material passes through one or more apertures formed at the plurality of locations within the x-y coordinate plane of the first vertical level. Likewise, printing a second layer can include controlling at least one of a viscosity of material and a temperature of material that is deposited such that the material passes through one or more apertures formed at the plurality of locations within the x-y coordinate plane of the second vertical level. The method can further include moving a printing plate having a plurality of apertures formed therein vertically along a z-axis prior to printing the second layer. In some embodiments, the printing plate can be moved with respect to one or both of the x-axis and the y-axis to establish the plurality of locations within the x-y coordinate plane at which the material is deposited for the second layer. This movement can entail, for example, pivoting the printing plate or incrementally shifting the printing plate along either or both of the x and y-axes. Such movement can allow for overhanging material to be deposited.

When printing a first layer, an extruder can be advanced along only a single axis, either an x-axis or a y-axis, to near simultaneously deposit material in the plurality of locations within the x-y coordinate plane of the first vertical level. The first vertical level is a layer of the plurality of layers printed along the z-axis. In alternative embodiments, printing a first layer can occur without advancing an extruder through the x-y coordinate plane to deposit the material in the plurality of locations within the x-y coordinate plane of the first vertical level. In some embodiments, printing a first layer by near simultaneously depositing material in a plurality of locations can include cycling a printing function between two or more locations of the plurality of locations to achieve near simultaneous depositing of the material within the x-y coordinate plane of the first vertical level.

The material deposited when printing each of the first and second layers can include a non-photocurable material. Alternatively, or additionally, the material deposited when printing each of the first and second layers can include a thermoplastic.

In another exemplary embodiment, a method for printing in three dimensions includes heating a material positioned proximate to one or more selected locations of a printing plate that has multiple apertures formed therein to pass the material from one side of the plate, through at least one aperture of the apertures, and to the other side of the plate to form a first printed layer. The method further includes heating a material positioned proximate to one or more selected locations of the printing plate to pass the material from one side of the plate, through at least one aperture of the apertures of the plate, and to the other side of the plate to form a second printed layer, with the second printed layer being disposed on top of the first printed layer.

The step of heating a material positioned proximate to one or more selected locations of a printing plate to form a first printed layer can include supplying electrical current to the printing plate to heat one or more conductive elements that define one or more apertures of the apertures. The one or more conductive elements can include multiple first conductive elements disposed along a first axis and multiple second conductive elements disposed along a second axis that is substantially perpendicular to the first axis. The action of supplying electrical current can further include supplying electrical current to one or more conductive elements of the first conductive elements and supplying electrical current to one or more conductive elements of the second conductive elements. In some embodiments, the supply of electrical current to one or more conductive elements of the first and/or second conductive elements can be cycled to control through which apertures material passes. The number of conductive elements through which electrical current is supplied, $2n$ where n is the number of nozzles or apertures, is substantially less than existing embodiments, in which electrical current is supplied to $n^2$ nozzles or apertures.

The printing plate can be moved vertically along a z-axis prior to printing the second layer. In some embodiments, the printing plate can be moved with respect to one or both of the x-axis and the y-axis prior to printing the second layer. This movement can entail, for example, pivoting the printing plate or incrementally shifting the printing plate along either or both of the x and y-axes.

The step of heating a material positioned proximate to one or more selected locations of a printing plate to form the first printed layer can include passing the material through at least two apertures of the multiple apertures in a near simultaneous manner. Likewise, the step of heating a material positioned proximate to one or more selected locations of a printing plate to form the second printed layer can include passing the material through at least two apertures of the multiple apertures in a near simultaneous manner. In some embodiments, heating a material positioned proximate to one or more selected locations of a printing plate to form a first printed layer can include applying a laser to the material.

In one exemplary embodiment of a printer, the printer includes a printing plate, an applicator, and a controller. The printing plate can have multiple first conductive elements disposed approximately parallel to each other along an x-axis and multiple second conductive elements disposed approximately parallel to each other along a y-axis such that the first conductive elements are approximately perpendicular to the second conductive elements and the intersection of the first and second conductive elements form a plurality of apertures. The applicator can be configured to apply a material to at least a portion of the printing plate, and the controller can be configured to selectively heat each of the first conductive elements and each of the second conductive elements such that a perimeter defined by the first and second conductive elements surrounding any aperture of the multiple apertures can be selectively heated to allow material applied by the applicator to be passed through the aperture.

In some embodiments, the printer can include one or more temperature feedback components able to measure a temperature of one or more of the first and second conductive elements and communicate such measurements to the controller. In some embodiments, the temperature feedback components can include multiple thermoresistors, with each of the first and second conductive elements each being associated with at least one thermoresistor of the multiple thermoresistors. In some other embodiments, the temperature feedback component can include a camera configured to measure a temperature of each of the first and second conductive elements. In still other embodiments, the temperature feedback component can include non-contact thermometers.

A cooling mechanism can be disposed on a side of the printing plate at which a material that passes through the aperture is located after the material has passed through the aperture. The cooling mechanism can be configured to cool and harden material after it passes through the aperture. The applicator can include a wiper configured to move along only one of an x-axis or a y-axis to apply material to at least a portion of the printing plate. The printer can also include a platform disposed on a side of the printing plate to which the material is configured to pass such that the platform receives the material after it passes through the printing plate. The platform can be configured to translate vertically along a z-axis. Further, the printing plate can be configured to move with respect to one or both of the x and y-axes to adjust a location of material that already passed through the aperture with respect to the platform. This movement can entail, for example, pivoting the printing plate or incrementally shifting the printing plate along either or both of the x and y-axes.

The controller can be configured to adjust a number of parameters, including but not limited to at least one of: vibration frequency, vibration timing, contact distance, contact time, contact temperature, aperture size, dwell time, and cooling time. In some embodiments, a coating mechanism can be configured to apply a coating material to each of the first and second conductive elements.

BRIEF DESCRIPTION OF DRAWINGS

This disclosure will be more fully understood from the following detailed description taken in conjunction with the accompanying drawings, in which.

DETAILED DESCRIPTION

Figure 1:
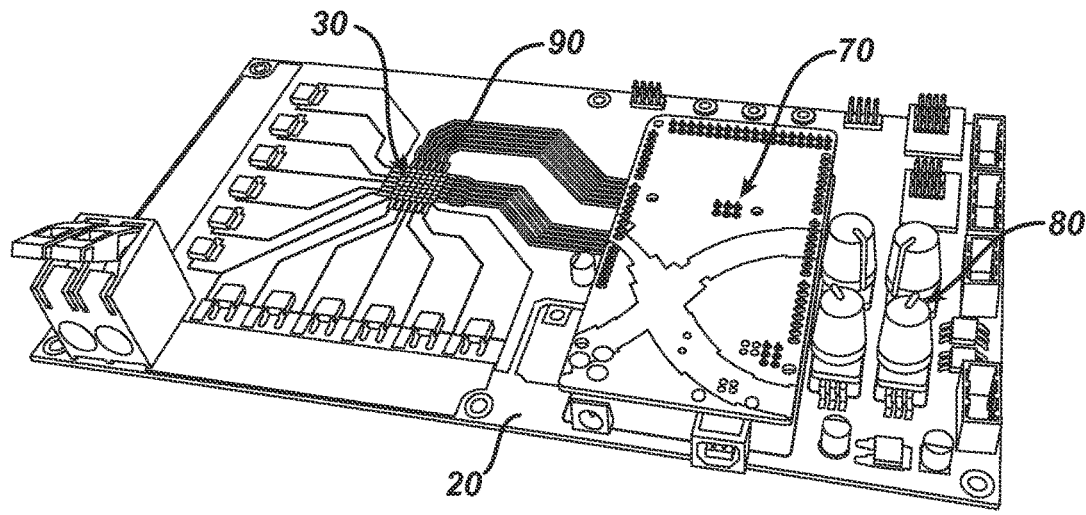
FIG. 1 is a perspective view of one exemplary embodiment of a portion of a three-dimensional printing system designed to print in an x-y coordinate plane.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-numbered components of the various embodiments generally have similar features when those components are of a similar nature and/or serve a similar purpose.

The present disclosure includes some illustrations and descriptions that include prototypes or bench models. A person skilled in the art will recognize how to rely upon the present disclosure to integrate the techniques, systems, and methods provided for into a product, such as a consumer-ready, warehouse-ready, or lab-ready three-dimensional printer. Further, although examples of objects that can be printed using the disclosures provided for herein include dashboards and furniture, a person skilled in the art will recognize many other objects, both large and small, that can be printed using the techniques, systems, and methods provided for herein. There are nearly limitless objects that can be printed using the techniques, systems, and methods of the present disclosure.

New techniques, systems, and devices that allow for higher throughput three-dimensional printing that is orders of magnitude greater than existing techniques, systems, and devices are provided for herein. The present disclosure provides for local viscosity control, which involves the ability to deposit material in a single vertical layer, i.e., an x-y coordinate plane, at multiple selected locations within the layer at the same time. The printing can be performed, for example, by a series of parallel extruders or nozzles capable of operating simultaneously or near simultaneously. The printing techniques, systems, and devices greatly reduce, and even eliminate in some instances, a need for a print head or build platform to travel to each individual location in a layer to deposit the material for that layer. As a result, printing time, and the amount of power needed to control a system or device, is drastically reduced. A person skilled in the art will recognize that in view of the present disclosures, printing an entire layer can be performed in a single programmed step. While this may come at the expense of precision in some instances, any loss in that respect can be negligible or irrelevant in certain industries, such as printing a dashboard or furniture prototypes, or performing printing in home or office printing contexts. Still further, the present disclosure provides some techniques to minimize any loss of accuracy that results from the present disclosure. In fact, theoretical models validate that the upper limit to machine resolution compares favorably with existing high-end three-dimensional printers.

Local Viscosity Control Printing Systems and Devices

FIG. 1 provides one exemplary embodiment of a three-dimensional printer set-up for printing in an x-y coordinate plane. The illustrated embodiment includes a printed circuit board 20 on which components of the systems and devices provided for in this disclosure are disposed. The components include a printing plate 30 where the printing occurs, a controller 70 that is electrically coupled to the printing plate 30 to selectively control a temperature at a location on the printing plate so that a printing material can be selectively deposited onto a build platform by passing the material through selected apertures or nozzles (the terms apertures and nozzles are often used interchangeably herein), and tuning elements 80 electrically coupled to the controller 70 to adjust one or more printing parameters, which in turn impacts the printing of the material at the printing plate 30. As shown and described with more particularity in FIG. 2, the printing plate 30 can include a plurality of conductive elements 32a, 32b, 32c, 32d, 32e, 32f extending along an x-axis and a plurality of conductive elements 32g, 32h, 32i, 32j, 32k, 32l extending along a y-axis to form a grid. The configuration of the conductive elements 32a-32l results in the formation of a plurality of apertures or nozzles 34a-34e, 36a-36e, 38a-38e, 40a-40e, 42a-42e having perimeters defined by portions of the conductive elements as illustrated.

Systems and devices provided for herein can also include an applicator or extruder, not shown, which can be used to position material to be deposited at the selected locations for extrusion through the printing plate 30. As described herein, in some embodiments the printing plate 30 can be incorporated into the applicator or extruder. Further, in some embodiments, a printing feedback component can be included as part of the system. The printing feedback component can provide information to the user and/or the controller 80 about one or more parameters associated with printing, including parameters related to the printing plate 30 and/or the material used in printing. In the illustrated embodiment, the printing feedback component includes a plurality of thermoresistors 90, with each thermoresistor providing feedback on a temperature of a conductive element 32a-32l of the printing plate 30. Although not visible in FIG. 1, the system can further include a long-wave infrared imager affixed at a location that is above or proximal to the printing plate 30. The long-wave infrared imager can be configured to provide temperature data in the form of an image where pixel values correspond to temperature in near real time.

Printing Plate

Figure 2:
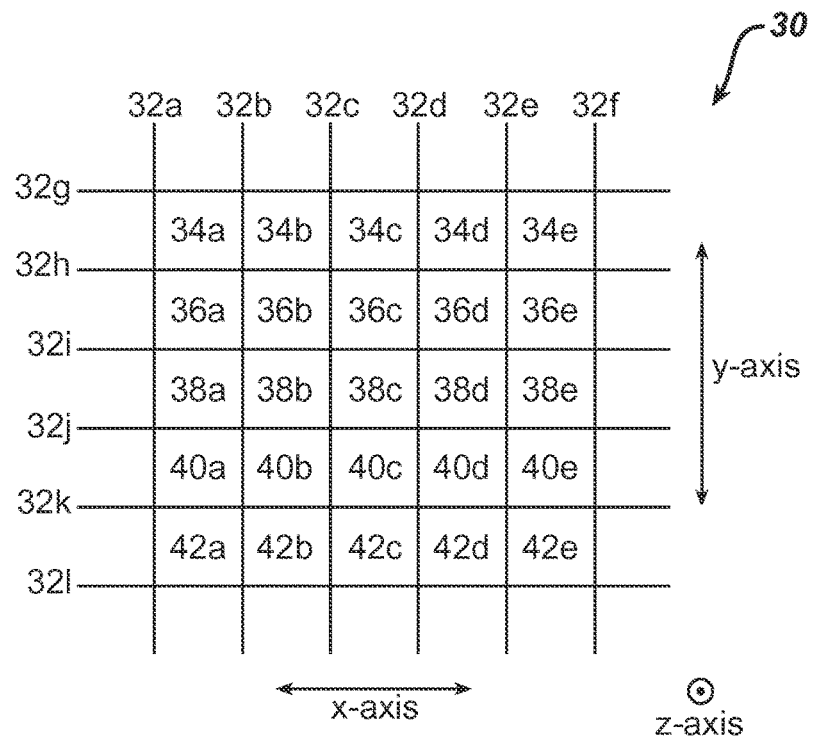
FIG. 2 is a top view of a printing plate of the printing system of FIG. 1.

The printing plate provided for in FIG. 2 includes a plurality of conductive elements 32a-32f, as shown six, disposed along an x-axis, and a plurality of conductive elements 32g-32l, again, as shown six, disposed along a y-axis. In the illustrated embodiment, the conductive elements extending along the same axis are approximately parallel to each other, and the conductive elements extending along opposed axes are approximately perpendicular to each other. A person skilled in the art, however, will recognize any number of shapes and designs that can be used to form the printing plate 30. Accordingly, while the illustrated embodiments provides for a grid having approximately equally spaced apertures 34a-34e, 36a-36e, 38a-38e, 40a-40e, 42a-42e, in other embodiments, apertures in the same printing plate may have different shapes (e.g., rectangles that are not squares, triangles, circles, hexagons, octagons, etc.) and sizes, including having some apertures that are bigger and/or different shapes than others in the same printing plate.

As described in further detail below, the location of the conductive elements 32a-32l can be moved in different layers such that a footprint formed by the printing plate 30 in one layer can be different than the footprint formed by the printing plate 30 in another layer located at a different location along a z-axis (which extends into and out of the paper in FIG. 2). The ability to move the printing plate 30, for instance by vibrating it, rotating it, or linearly shifting it, can expand the number of possible selected locations for printing within the x-y coordinate plane, whether that plane is in the same location along the z-axis or a different plane along the z-axis. Movement of the printing plate 30 along any of the x, y, or z axes can be driven by one or more actuators coupled to one or more of the conductive elements. For example, in some instances it may be desirable to move a location of one or more of the conductive elements, such as moving every other conductive element extending along the x-axis, e.g., conductive elements 32a, 32c, and 32e, to form multiple-sized rectangles in the grid.

As shown, apertures 34a-34e, 36a-36e, 38a-38e, 40a-40e, 42a-42e the printing plate 30 are bound by or are otherwise formed by lengths of the conductive elements 32a-32l. The conductive elements 32a-32l define a perimeter that surrounds each aperture 34a-34e, 36a-36e, 38a-38e, 40a-40e, 42a-42e. Each conductive element 32a-32l can be individually heated to control its temperature, and thus the temperature of each side of the perimeter of each aperture 34a-34e, 36a-36e, 38a-38e, 40a-40e, 42a-42e. Conductive elements 32a-32l can be heated in a number of ways, but in one exemplary embodiment a current is supplied to a conductive element to heat it. Accordingly, if conductive elements 32a and 32b on the x-axis and conductive elements 32j and 32k on the y-axis are heated, the temperature at aperture 40a is hotter than at the surrounding locations because each length of the perimeter is heated, while several apertures, such as apertures 38a, 40b, and 42a, only have some lengths of its perimeter heated.

The heating of a printing plate is more clearly illustrated in FIGS. 3A-3E. The printing plate 30' has significantly more apertures than the plate 30 of FIGS. 1 and 2, and in fact is significantly larger than the one provided for in FIG. 1. The printing plate 30 of FIGS. 1 and 2 is provided for illustrative and prototype purposes, and the plate 30' provided for in FIGS. 3A-3E is more akin to the type of plate that may be used in commercially available three-dimensional printers. Accordingly, a person skilled in the art will appreciate that although the printing plate 30 in FIG. 1 is significantly smaller than the controller 70, in other embodiments the printing plate can be significantly bigger than the controller to allow for large objects to be printed, such as furniture and dashboards.

Figure 3A:
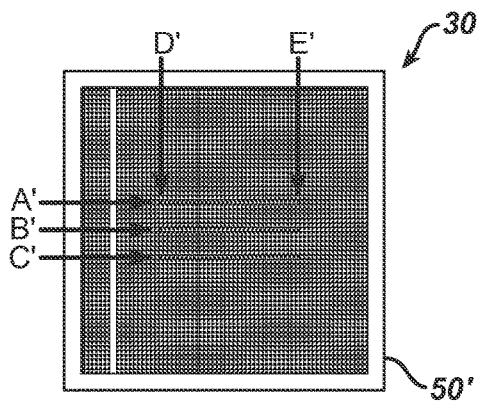
FIGS. 3A-3E are sequential, schematic illustrations of an exemplary embodiment of a printing plate for use in the three-dimensional printing systems, devices, and techniques provided herein, the sequential illustrations demonstrating a parallel printing process.

As shown in FIG. 3A, the selected locations for printing the illustrated layer are rows A', B', and C', extending between columns D' and E'. The printing occurs by passing material through apertures of the printing plate 30' and to a build platform 50' disposed below or distal to the printing plate 30', on an opposite side of the printing plate 30' of the material to be deposited. Notably, for purposes of this description, it is understood that the material to be extruded is proximate to the printing plate 30'. Methods and devices for positioning the material at selected locations are described later. Further, while one method, including an order, of activating various conductive elements is described with respect to FIGS. 3A-3E, a person skilled in the art will recognize a multitude of ways and orders in which various conductive elements can be activated to also perform three-dimensional printing in accordance with the descriptions provided for herein. Likewise, other methods for heating the material at various locations with respect to the printing plate 30' can also be used without departing from the spirit of the present disclosure.

Figure 3B:
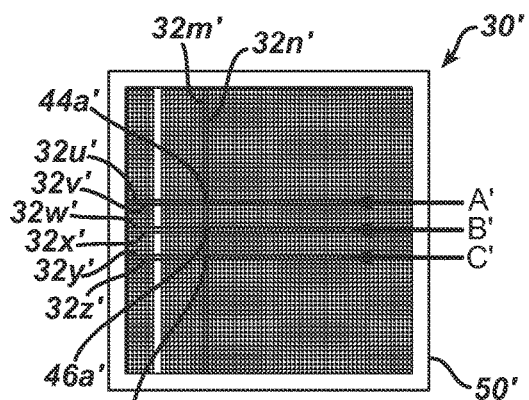

FIG. 3B illustrates one exemplary starting point for activating conductive elements $32m'$-$32z'$ to heat material proximate to the plate 30' to pass the material through the apertures (only some of which are labeled in the figures to prevent clutter) at selected locations. In this particular method, a sweep of current applied to the conductive elements $32m'$-$32t'$ disposed along the x-axis is used while current is continuously applied to the conductive elements $32u'$-$32z'$ disposed along the y-axis for the entire course of the sweep. In the illustrated embodiments, conductive elements $32m'$ and $32n'$ are heated by applying current thereto and conductive elements $32u'$, $32v'$, $32w'$, $32x'$, $32y'$, and $32z'$ are likewise heated by applying current thereto. The net result is that apertures $44a'$, $46a'$, and $48a'$ are heated to a level sufficient to pass the material through therethrough to an opposed side of the plate, and subsequently onto the build platform 50'. While other portions along the lengths of the activated conductive elements are heated, other apertures are not activated because the entire perimeter of the other apertures does not receive current. The printing plate 30' in the illustrated embodiment is configured in a manner such that only when the entire perimeter that defines the aperture of the printing plate is heated to a threshold temperature does the material heat sufficiently to pass through the aperture. Of course, it is possible to configure the printing plate 30', in view of the material being used to print, to operate such that not an entire perimeter is heated and a material can still be passed through the apertures without departing from the spirit of the present disclosure. A person skilled in the art, in view of the disclosures herein, would understand how a number of variables interplay that allow other configurations to exist if desired.

Figure 3C:
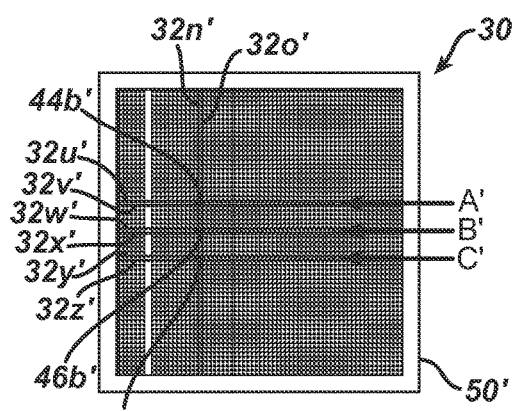

The sweep process continues in FIG. 3C, in which the conductive element $32m'$ is deactivated and the subsequent conductive element $32o'$ is activated. The conductive element $32n'$ remains activated. As a result, the apertures $44b'$, $46b'$, and $48b'$, which as shown are adjacent to apertures $44a'$, $46a'$, and $48a'$, are heated to a threshold temperature that is sufficient to allow the material to pass through the apertures $44a'$, $46a'$, and $48a'$ to an opposed side of the plate 30', and subsequently onto the build platform 50'.

Figure 3D:
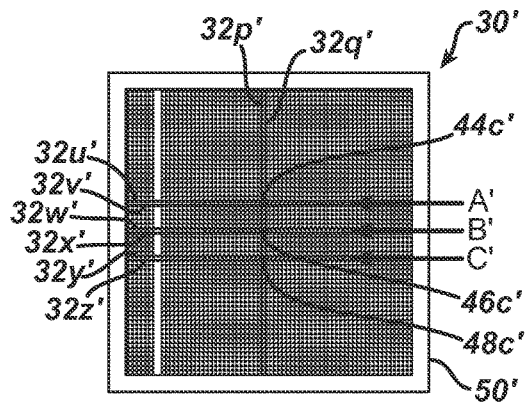
Figure 3E:
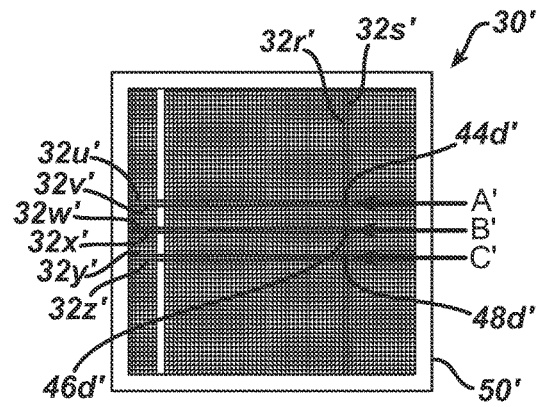

FIG. 3D illustrates a further point in the sweep process in which additional conductive elements disposed further down the line along the x-axis from the conductive elements $32m'$, $32n'$, and $32o'$ are activated. In the illustrated embodiment, these conductive elements are identified as conductive elements $32p'$ and $32q'$ and are activated as part of the sweep to heat the apertures $44c'$, $46c'$, and $48c'$ to at least a threshold temperature at which printing through the plate 30', via the apertures, occurs. The material is again deposited on the build platform 50'. In between FIGS. 3C and 3D, the other conductive elements disposed therebetween are activated to print the interim portions of the desired print rows A', B', and C' on the build platform 50'. Likewise, FIG. 3E illustrates a final two conductive elements $32r'$ and $32s'$ disposed along the x-axis that are activated to complete the sweep and finish the printing of the layer at the apertures $44d'$, $46d'$, and $48d'$, onto the build platform 50'. As with FIGS. 3C and 3D, in between FIGS. 3D and 3E the other conductive elements disposed therebetween are activated to print the interim portions of the desired print rows A', B', and C' onto the build platform 50'.

The sweep illustrated in FIGS. 3A-3E can be achieved by a single print command and can be achieved in a fast amount of time, for instance, a second or less (longer sweep times are also possible if desired). Likewise, the sweep allows for simultaneous printing at multiple locations (e.g., at apertures $44a'$, $46a'$, and $48a'$), and near simultaneous printing across the layer (e.g., from apertures $44a'$, $46a'$, and $48a'$ to apertures $44d'$, $46d'$, and $48d'$). Notably, in prior art embodiments of three-dimensional printers, each of the apertures $44a'$, $46a'$, and $48a'$ is individually controlled and depositing a material at each aperture occurs separate from depositing a material at each other aperture. As a result, the number of conductive elements (n) controlled by the system is $n^2$. In the present embodiment, however, the number of conductive elements controlled by the system is reduced significantly. As shown, the number of conductive elements (n) controlled by the system is 2n, which includes each of the conductive elements $32m'$-$32t'$ extending along the x-axis and each of the conductive elements $32u'$-$32z'$ extending along the y-axis.

The method provided for in FIGS. 3A-3E, as well as the other methods provided for in the present disclosure, allow for material to controllably flow through a plurality of locations (e.g., through apertures or nozzles) at some time in a simultaneous or near simultaneous manner. Control is exercised by selectively heating the material in close proximity to any number of desired locations, which lowers the material's viscosity and reduces surface tension. By pairing a particular material with a properly-sized array of apertures, heat modulation and resultant viscosity modulation allows for the activation force required to push or draw the heated material through the plate to fall to such a level that a droplet might be separated from the printing plate 30' and adhere to the build platform 50' or to a previously printed layer disposed below or distal of the printing plate. Upon removal of heat, the viscosity increases and the remaining material on the printing plate or previous layer(s) solidifies, awaiting further deposition and/or recoating of the printing plate, as described below. Accordingly, the present systems, devices, and methods leverage the relationship between temperature of the material and its viscosity to print in a controlled manner in parallel at multiple selected locations for a single layer, i.e., a single x-y coordinate plane.

Figure 4:
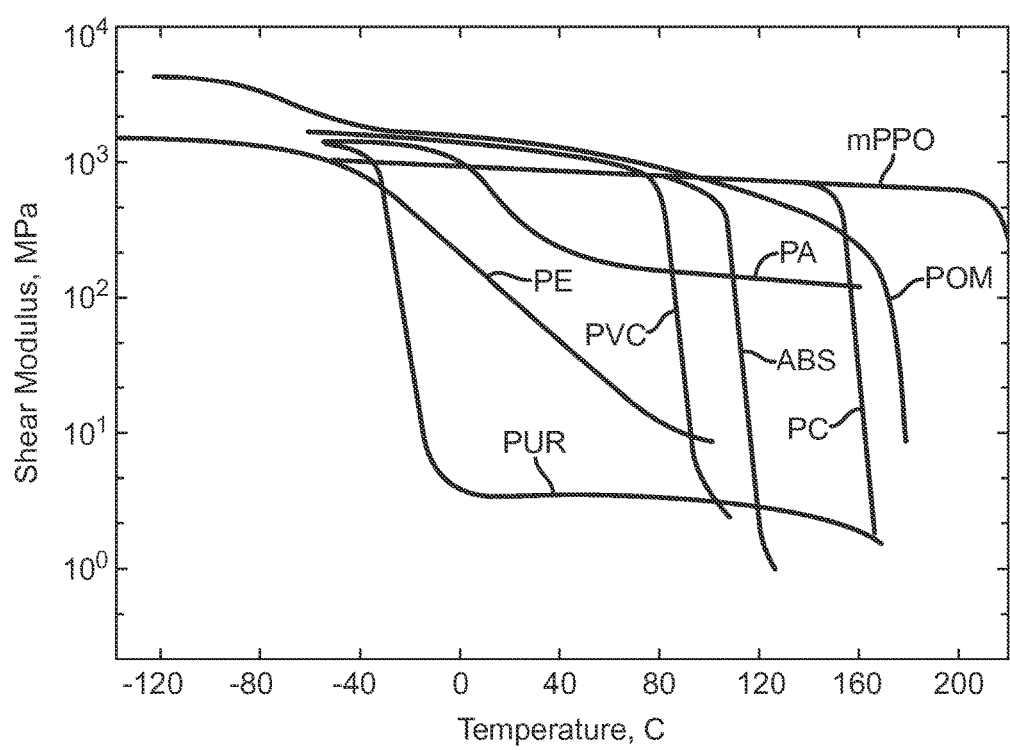
FIG. 4 is a table illustrating the effect of temperature on shear modulus for a plurality of materials that can be used as a medium for printing with the systems, devices, and techniques provided herein.

In fact, whether material passes through an aperture of the printing plate 30, 30' is a function of viscosity and temperature, among other parameter associated with the methods, systems, and devices. As the temperature of material proximate to the apertures increases, the material becomes less viscous. If the temperature increases enough, and the viscosity drops a sufficient amount, the material will pass through one or more apertures of the plates 30, 30'. FIG. 4 provides a table illustrating the impact of temperature on the shear modulus for a number of different materials that can be used in conjunction with the printing plates provided for in the present application, including acrylonitrile butadiene styrene (ABS), polyamides (PA), polycarbonate (PC), polyethylene (PE), polyurethane (PUR), polyvinyl chloride (PVC), and polyoxymethylene (mPPD). As shown, generally as the temperature increases, the shear modulus decreases. When a particular threshold temperature is achieved, there is a drastic drop in the shear modulus for the material. When the material is heated to this threshold temperature, or a temperature greater than the threshold temperature, the significant decrease in shear modulus allows the material to be extruded through the aperture. The present disclosure is directed to controlling at least one of the temperature and viscosity of the printing material to deposit the material at selected locations, i.e., selected apertures or nozzles of the printing plate. As discussed elsewhere in the application, other parameters, including but not limited to the surface tension of the printing plate and the size of the aperture, can also impact whether the material passes through the aperture, and thus also can be used to control the location of material deposition.

While the sweep illustrated in FIGS. 3A-3E involved the sequential activation of conductive elements 32m'-32t' extending along the x-axis, in other embodiments the sweep is not sequential. The order at which the conductive elements along the x-axis, and/or along the y-axis, are activated can be done in any manner in which the material is still passed through all of the selected locations to achieve the desired output for that layer. In some embodiments, more than two conductive elements extending along the x-axis can be activated at the same time to speed up the printing process even further. Of course, because some conductive elements may overlap with others such that it can cause other apertures that are not intended to be activated to become activated, care should be taken by a user to activate conductive elements that are far enough apart from other conductive elements to avoid unintended activation. Further, techniques for avoiding unintended activation are also provided for herein to assist in further speeding up the process without printing at unselected locations.

As described above, the printing plate 30, 30' can have any number of shapes, sizes, and configurations. In some exemplary embodiments, a width of the printing plate can be in the range of about 0.5 millimeters to about 100 centimeters, and a length of the printing plate can likewise be in the range of about 0.5 millimeters to about 100 centimeters. A person skilled in the art, however, will recognize that these dimensions, like the other dimensions provided for in the present disclosure, can depend on a variety of factors, including but not limited to the power, resolution, practicality, size and shape of other components with which it is used, and the desired use of the plate. The apertures formed in the plate 30, 30' can likewise have any number of shapes, sizes, and configurations. In some exemplary embodiments, the apertures cover a surface area in the range of about 1 millimeter squared to about 10 centimeters squared. The exemplary ranges provided for herein, however, are in no way reflective of the possible range of shapes, sizes, and configurations. A person skilled in the art will recognize that the shape, size, and configuration of the printing plate 30, 30', and its apertures formed therein, depend, at least in part, on the object being printed, the material being used to print, and the material of the printing plate. The plate 30, 30' can also be made from a number of different materials. In some exemplary embodiments, the conductive elements comprise nichrome and are coated by one of fiberglass, polytetrafluoroethylene (PTFE), and a hydrophobic wax having a low melting temperature. The coating can help better control the selective depositing of material through apertures, as described in greater detail below. A variety of other conductive materials, including but not limited to other metals, can be used to form the conductive elements.

Figure 5:
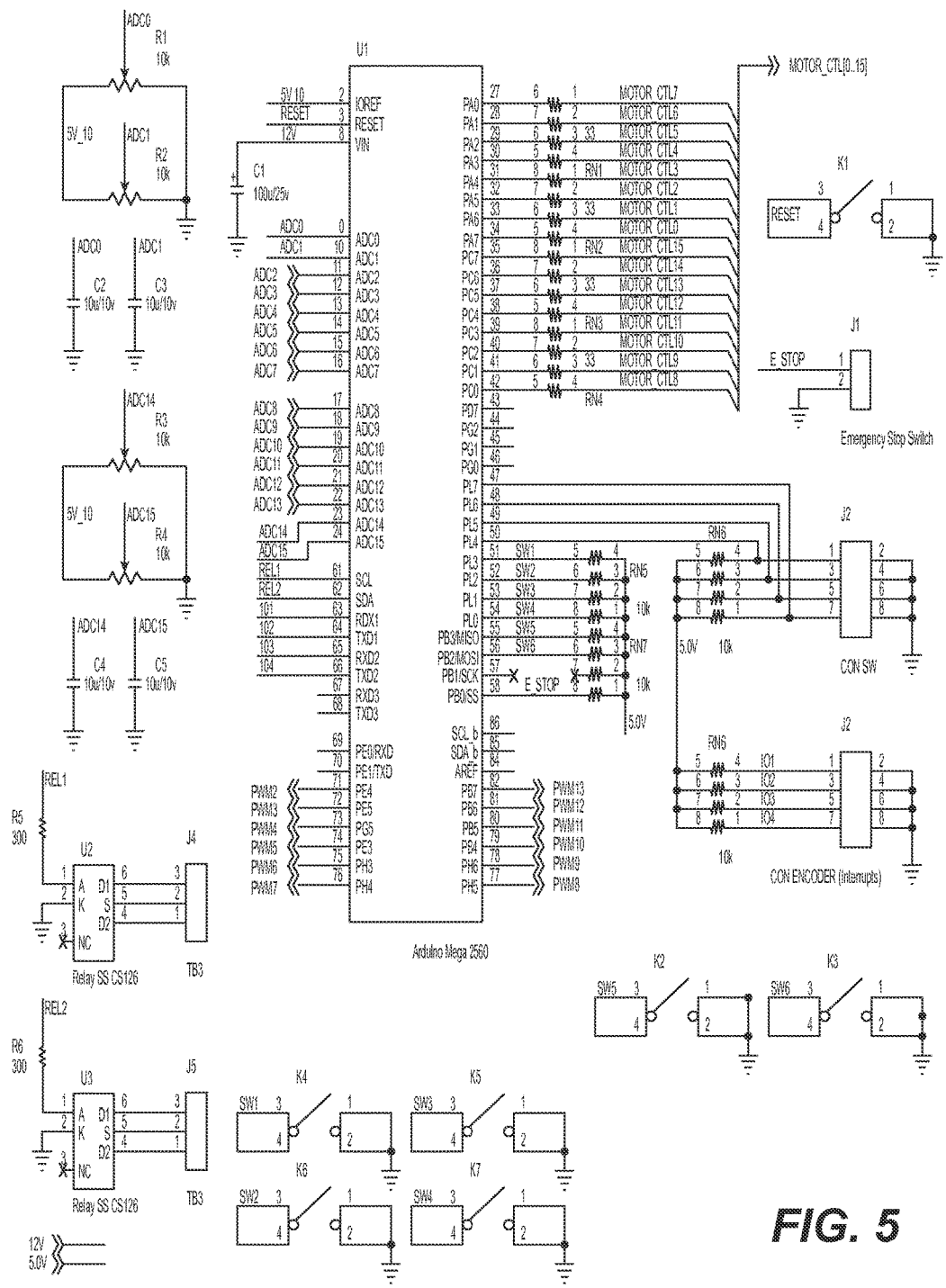
FIG. 5 is a schematic view of electrical circuits associated with a circuit board of the three-dimensional printing system of FIG. 1.

FIGS. 5-8 provide schematic diagrams of circuitry associated with the systems, devices, and methods provided for herein. More particularly, FIG. 5 provides for the circuitry associated with the circuit board 20 of FIG. 1. While a person skilled in the art will understand how to read this diagram, it generally provides for a number of components that can be operated to drive the microcontroller 70, and thus the conductive elements 32a-32l of the printing plate 30. A number of switches are provided, including an emergency stop switch. Further, the illustrated thermoresistors provide temperature feedback. A person skilled in the art, in view of the provided illustrations, will recognize that voltage can be controlled by pulse-width modulation. The amount of current going to the conductive elements can determine a trace size, and thus a size of the "inputs" to each conductive element.

Figure 6:
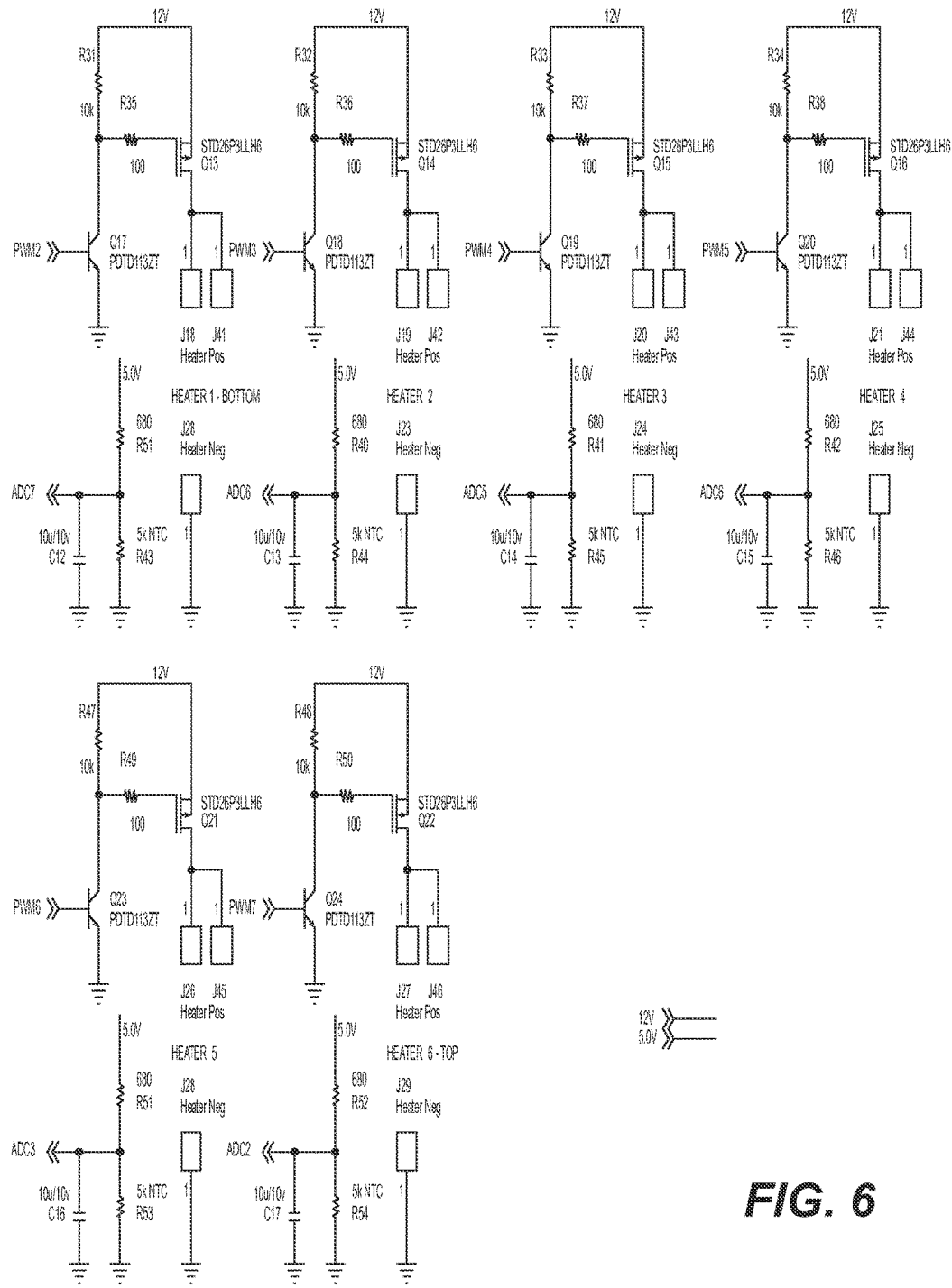
FIG. 6 is a schematic view of electrical circuits associated with conductive elements of the printing plate of FIG. 2 that are disposed along a y-axis thereof.
Figure 7:
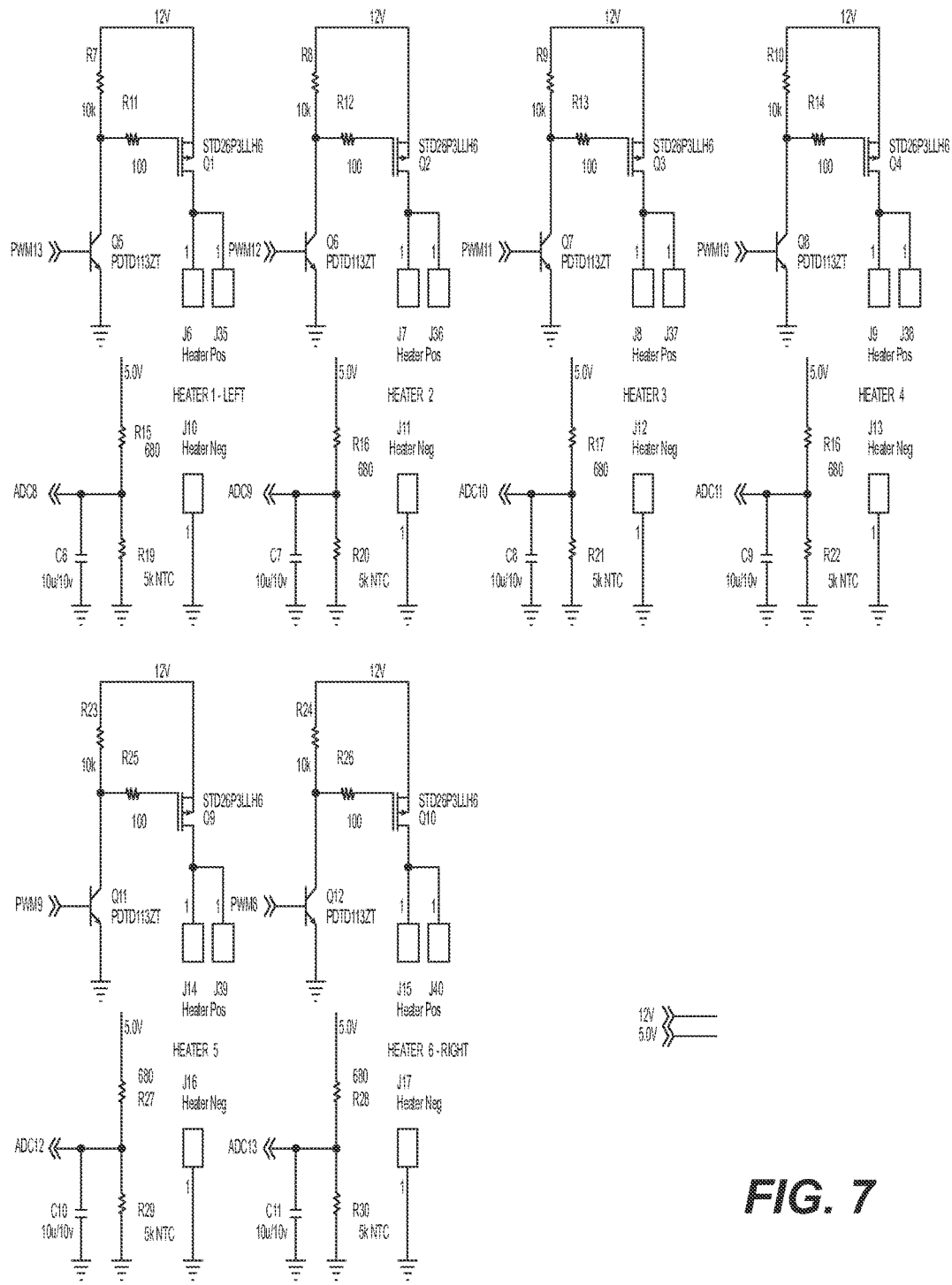
FIG. 7 is a schematic view of electrical circuits associated with conductive elements of the printing plate of FIG. 2 that are disposed along an x-axis thereof.
Figure 8:
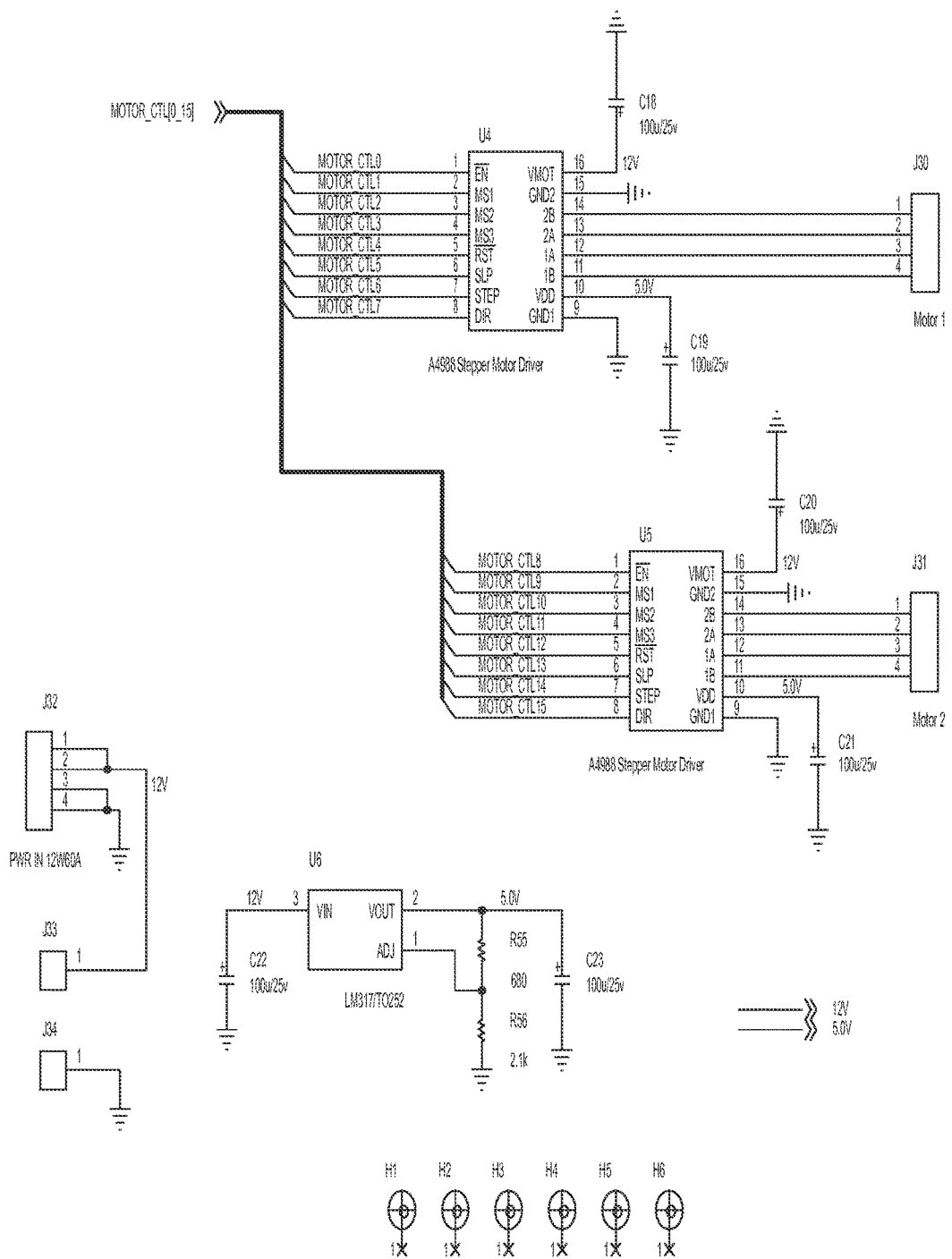
FIG. 8 is a schematic view of electrical circuits associated with motors of the three-dimensional printing system of FIG. 1.

The electrical controls of the conductive elements 32g-32l extending along the y-axis and of the conductive elements 32a-32f extending along the x-axis are provided for in FIGS. 6 and 7, respectively. A person skilled in the art will understand how to read these diagrams, which in turn illustrate components of the conductive elements. Reference to a "heater" in the figures is equivalent to a conductive element. Still further, FIG. 8 provides for a control shield and supply that powers the circuitry on the circuit board 20.

Although the descriptions above describes heating the conductive elements 32a-32l and 32m'-32z' by supplying current to the conductive elements, a person skilled in the art will recognize there are a variety of other ways by which the conductive elements can be heated to threshold temperatures sufficient to allow material to pass through apertures of the printing plate 30, 30' defined by the conductive elements. By way of non-limiting example, lasers can be used to heat the conductive elements. In such an instance, the printing plate may be kept at a particular, heated, baseline temperature that is below the threshold temperature for material deposition, and then a laser can be applied to selected portions of the printing plate to heat those portions above the threshold temperature to achieve material deposition. In alternative embodiments, heat can be applied directly to the material, by a laser or other suitable heating element, to heat the material to a threshold temperature that allows the material to pass through desired apertures of the printing plate. The material can pass through selected apertures because at least one of reduced viscosity and a resultant increased flow, or through wicking and contact forces or capillary action. Still further, convective or radiative heat transfer can assist in passing the material through the aperture of a printing plate. More particularly, in some embodiments, the printing plate can be disposed on a thermoplastic sheet or the like and begin to droop without any contact, thereby reducing a separation force. A loss of resolution, however, can occur as a result of this configuration.

Addressing Schema

Figure 9:
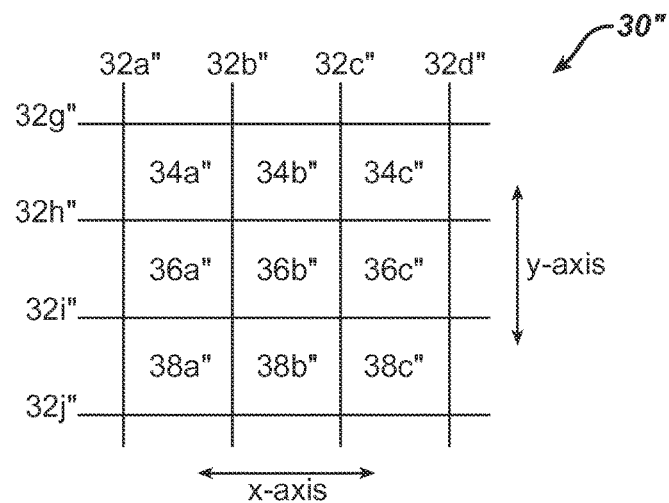
FIG. 9 is a schematic view of a printing plate for use in a printing system like the system of FIG. 1.

As described above, multi-aperture selection can be used to achieve near simultaneous printing by sequencing the order by which conductive elements are activated. By way of non-limiting example, FIG. 9 illustrates an embodiment of a printing plate 30" that includes four conductive elements 32a", 32b", 32c", 32d" extending along the x-axis and four conductive elements 32g", 32h", 32i", 32j" extending along the y-axis, resulting in nine apertures or nozzles 34a", 34b", 34c", 36a", 36b", 36c", 38a", 38b", 38c" being formed on the printing plate 30". In such a configuration, it may be that the desired locations for printing are at apertures 34a" and 38a". However, if the conductive elements 32a", 32b", 32g", 32h", 32i", and 32j" are all activated to heat the entire perimeters of the conductive elements that define the apertures 34a" and 38a", not only are apertures 34a" and 38a" activated, but so too is aperture 36a" by virtue of the perimeter surrounding aperture 36a" being activated by the conductive elements 32a", 32b", 32h", and 32i".

One technique that can be utilized to print at apertures 34a" and 38a" without printing at 36a" involves cycling between activating apertures 34a" and 38a" at different, but consecutive, times, such that their activation is near simultaneous. In such an instance, current can be applied to the conductive elements 32a", 32b", 32g", 32h" to activate aperture 34a" for printing, and then current can be cut-off to conductive elements 32g", 32h" and instead current can be applied to the conductive elements 32i", 32j" to activate aperture 38a". The application of current to the conductive elements 32g", 32h", 32i", 32j" in a quick, cyclical manner can then continue until the material is deposited. The cycling of the conductive elements can prevent the threshold temperature from being achieved for the aperture 36a", thus preventing the aperture 36a" from being activated. The commands to cycle conductive elements can be referred to as using an addressing schema.

In other embodiments, a vibration motion can be applied to the apertures 34a" and 38a", for instance by vibrating at least one of the printing plate 30" and the build platform 50", to encourage passing material through those apertures while not passing through aperture 36a". Alternatively, or additionally, a build platform disposed below or distal to the printing plate 30" can be vibrated to help work the material through the apertures 34a" and 38a". That is, once the material contacts the build platform, the platform can be vibrated, moved along the z-axis, or otherwise actuated to help pull the material through the aperture(s) of the printing plate 30". Further, in some embodiments, provided a material being deposited has a long cooling time, the apertures can be heated sequentially but still printed simultaneously, i.e., effective in parallel, as long as contact is made before the heated material (e.g., plastic) is cooled.

Printing Parameters

The temperature to which the conductive elements are heated so that the material can pass through apertures disposed at selected locations, i.e., the threshold temperature, depends on a variety of factors or parameters associated with the system and the material. Some of these parameters are set based on the configuration of the components of the system and/or the material being used to print. Further, some parameters are able to be adjusted in real time to achieve desired printing effects in real time. For example, the tuning elements can be used to adjust one or more printing parameters and/or to turn the flow of current to selected conductive elements on and off. In some embodiments, some of the parameters are controlled by software associated with the microcontroller or otherwise associated with the system.

A person skilled in the art will recognize a variety of parameters that exist with respect to the systems, devices, and methods disclosed. One parameter is the type of material used in printing. As described above, various materials have different profiles, and thus the temperature at which they are able to flow through an aperture differs. Various thermoplastics or other polymers can be used as the material for printing. In general, the material can be a variety of non-photocurable materials. Some materials for use as the material for printing include but are not limited to ABS, PA, PC, PE, PUR, PVC, mPPD, and polylactic acid (PLA).

Figure 10:
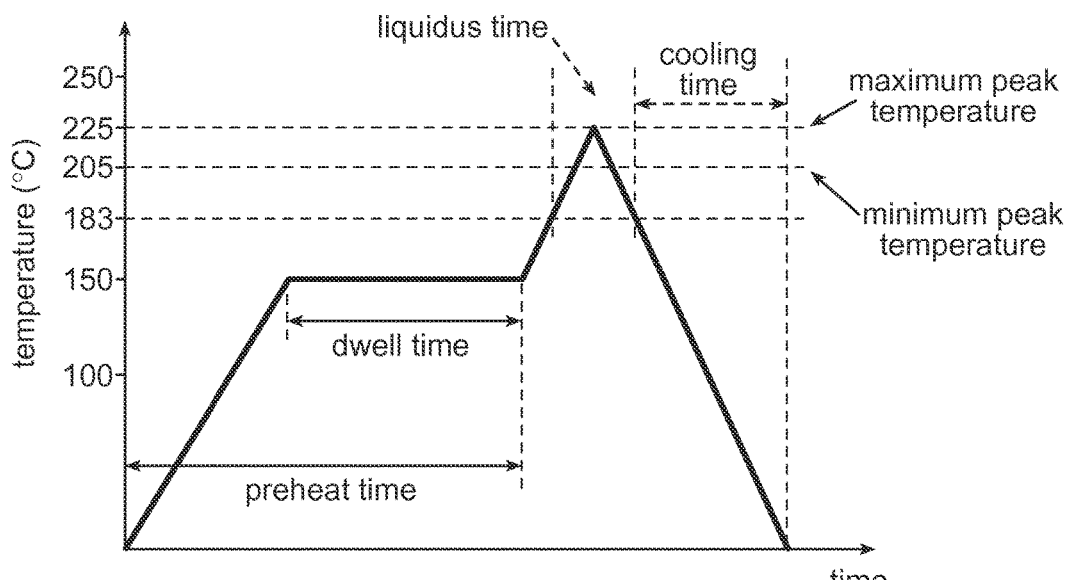
FIG. 10 is a graph of one exemplary embodiment of a reflow profile associated with using the printing system of FIG. 1.

A thickness of the material also impacts the temperature and rate at which the material flows through the printing plate. In some embodiments, a heat profile for the material can be known, and the various aspects of the heat profile can impact how well the material prints. An exemplary embodiment of a heat profile of material to illustrate rheological properties is provided for in FIG. 10, and includes a preheat time, a dwell time, a liquidus time, a cooling time, and minimum and maximum peek temperatures. The profile is akin to solder reflow profiles. At least some of these parameters can be adjusted, such as the preheat and dwell times, which in turn can impact some of the other parameters, such as the liquidus time, cooling time, and minimum and maximum peek temperatures. While many of these parameters are dependent on a variety of factors, in some exemplary embodiments a temperature to which the conductive elements are heated, and thus the material associated therewith is heated, is in the range of about 150° C. to about 300° C., and more particularly in the range of about 200° C. to about 300° C. The temperature is sometimes referred to as a contact temperature because it is the temperature to which the conductive element is heated, which contacts the material to heat the material to a similar temperature. For example, a temperature to which conductive elements surrounding a selected aperture can be heated to extrude PLA of a normal thickness (e.g., 0.3 millimeters, although a range of thicknesses is possible) through the selected aperture is about 180° C. or more, while a temperature to which conductive elements can be heated to extrude ABS of a normal thickness (e.g., 0.3 millimeters, although a range of thicknesses is possible) through the selected aperture is about 240° C. The amount of time during which the conductive element surrounding an aperture is heated to the threshold temperature or greater, and thus the approximate amount of time the material is in contact with the conductive elements heated to the threshold temperature, is referred to as a contact time. The contact time can also impact the printing result, and can be adjusted as desired by the user and/or the controller. Likewise, a cooling time, i.e., the amount of time the material is allowed to cool before a next layer is printed on top of it, can also impact the printing result and can be adjusted as desired by the user and/or the controller. In some embodiments, a cooling time can be in the range of at least about 0.5 seconds to about 1 second. Further, the cooling time can be impacted by whether cooling is active, such as using a fan as described further below, or passive.

Similarly, a size, shape, and material of the printing plate also impacts the threshold temperature and rate at which the material flows through the printing plate, and more particularly these dimensions as they relate to the apertures or nozzles themselves. As an area of the aperture increases, it becomes easier for material to pass through. Likewise, a thickness or depth of the aperture or nozzle, i.e., the distance across which the material travels when being extruded through the printing plate, also impacts the threshold temperature and rate at which the material flows. Still further, various materials can make it easier or harder for the printing material to flow through the apertures. In some embodiments, the printing plate can be coated with materials to adjust the printing performance. Some exemplary materials used to coat the printing plate include fiberglass, ceramics, PTFE, and a hydrophobic wax having a low melting temperature.

Further, parameters that involve the displacement of one or more components of the system can also impact the printing. Vibrating either or both of the printing plate and the build platform can decrease the temperature at which the material is to be heated in order to pass through the aperture of the printing plate because the vibration can encourage the material through the aperture. With respect to the build platform, the vibration generally becomes effective once a portion of the material is in contact with the build platform, i.e., after a portion of the material has passed through the aperture. Various parameters of the vibration itself, such as the frequency of vibration and the timing of vibration, can be adjusted by the user and/or the controller. Additionally, the distance between the material and the printing plate, as well as a distance between the printing plate and the build platform, can impact the temperature to which the material is heated via the conductive elements.

One or more motors can be operated to provide vibration and/or to change the distance between two components of the system. In some exemplary embodiments, a motor vibration can be provided by an electrical potential in the range of about 0 Volts (i.e., no vibration) to about 6 Volts, and a contact distance between the printing plate and the build platform can be in the range of about 0.05 millimeters to about 13 millimeters, and more particularly can be in the range of about 0.1 millimeters to about 3 millimeters. A person skilled in the art will recognize that a contact distance or gap can be measured from the printing plate to the extruder, in which case it can be as high as the part itself plus c, or it can be measured from the top of the part in which case it is c. The material used to form the build platform can also impact the printing. In some embodiments, the material can be a substrate, such as garolite fiberglass or an extruded material. The amount of time the material contacts the build platform can likewise be adjusted as desired by the user and/or controller.

Still further, additional actions can be applied to the material and/or the printing plate to assist in depositing the material from one side of the printing plate, through one or more apertures, and to the other side of the printing plate. The actions can be those that are effective to create a positive pressure drop in the region, such as applying a squeegee, using compressed air, or relying on gravity and/or hydrostatic pressure to encourage the material to pass through the apertures.

The temperature of the conductive elements can be monitored in a variety of manners using various temperature feedback components. In the illustrated embodiment of FIG. 1, one or more thermoresistors 90 are electrically coupled to each conductive element to monitor a temperature of the conductive element. One or more of the aforementioned parameters, as well as other parameters, can be adjusted in view of the feedback provided by the thermoresistors. In other embodiments, a camera capable of measuring temperatures, a sensor capable of measuring temperatures, and/or non-contact thermometers can be used to monitor the temperature of the conductive elements.

Line and Plate Extruders

As discussed earlier, the embodiments illustrated thus far do not illustrate a mechanism for disposing the material proximate to a printing plate for extrusion. A person skilled in the art will recognize a variety of ways by which the material can be disposed proximate to a printing plate for use in conjunction with the systems, devices, and methods provided for in the present disclosure. Notably, because the present disclosure allows for parallel extrusion within a single layer, mechanisms that can deposit material at multiple locations in an x-y coordinate plane, referred to herein as applicators and extruders, allow for the benefits of the present disclosure to be achieved.

Figure 11:
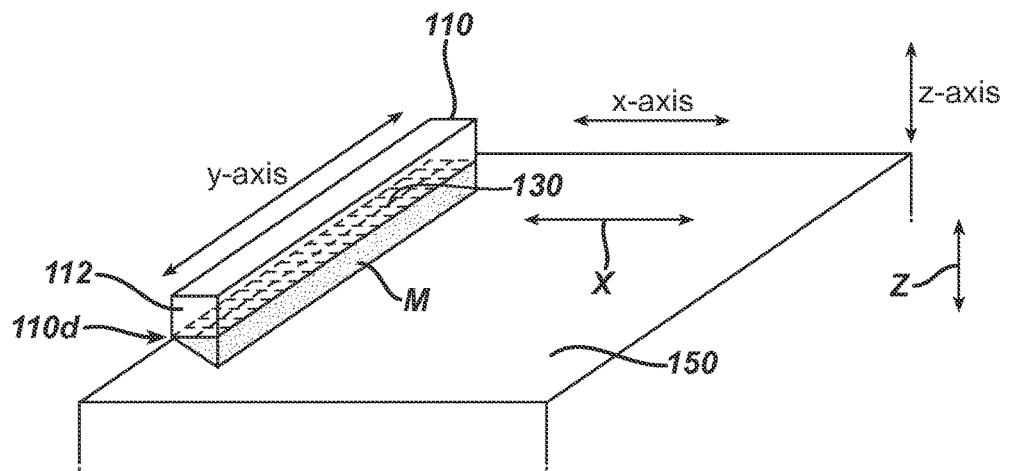
FIG. 11 is a perspective view of another exemplary embodiment of a three-dimensional printing system, the system including a line extruder.

In one exemplary embodiment illustrated in FIG. 11, a one-dimensional or line extruder 110 is provided. The extruder 110 includes both a printing plate 130 disposed at a distal end 110*d* of the extruder 110 through which a material M can be deposited onto a build platform 150 and a reservoir 112 that includes the material M to be printed. As shown, the extruder 110 extends a substantial length along the y-axis of the build platform 150 and can be moved along the x-axis to print at multiple locations along the x-y coordinate plane defined by the build platform 150. Thus, a single layer can be printed by passing the extruder 110 in a single direction (i.e., only along the x-axis) a single time, as illustrated by the arrow X. In other embodiments, the single layer can be printed by passing the extruder 110 only along the y-axis a single time. Once the layer is completed, the build platform 150 can be moved along a z-axis, as illustrated by the arrow Z, and the next layer can be printed. In other embodiments, the extruder 110 moves along the z-axis to position the extruder 110 at a location at which the next layer can be printed.

Figure 12:
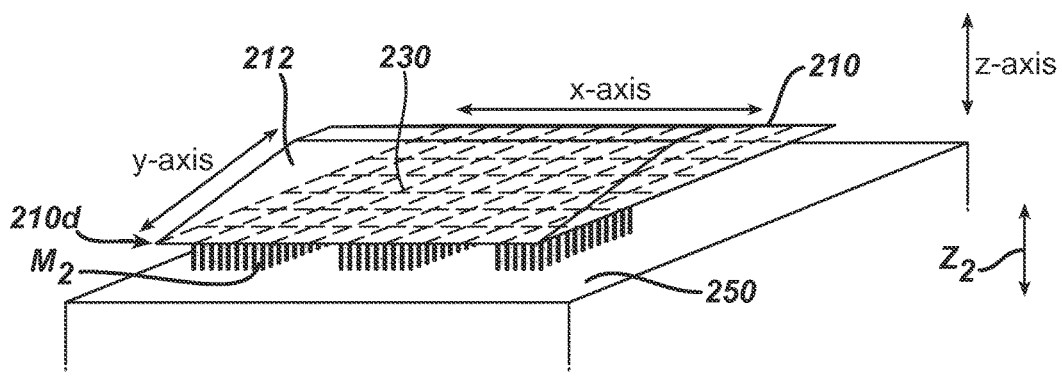
FIG. 12 is a perspective view of still another exemplary embodiment of a three-dimensional printing system, the system including a plate extruder.

In another exemplary embodiment illustrated in FIG. 12, a two-dimensional or plate extruder 210 is provided. The extruder 210 includes both a printing plate 230 disposed at a distal end 210*d* of the extruder 210 through which a material $M_2$ can be deposited onto a build platform 250 and a reservoir 212 that includes the material $M_2$ to be printed. As shown, the extruder 210 extends a substantial length along both the x and y-axes of the build platform 250. Thus, a single layer can be printed without moving the extruder 210 at all. In other embodiments, some movement along either or both the x and y-axes may be desired. Movement along either axis is permitted if desired for each of the line and plate extruders 110, 210. Once the layer is completed, the build platform 250 can be moved along a z-axis, as illustrated by the arrow $Z_2$, and the next layer can be printed. In other embodiments, the extruder 210 moves along the z-axis to position the extruder 210 at a location at which the next layer can be printed.

Notably, in both the line and plate extruder embodiments, the weight of the extruder 110, 210 itself is significantly less than extruders used in existing three-dimensional printing systems and devices. This is at least because there is less hardware needed to actuate the extruder 110, 210 to different locations within the x-y coordinate plane. While in previous embodiments motors were needed to move the extruder to each selected location in a layer to print, thus allowing the extruder to move both along the x-axis and along the y-axis, the line extruder 110 is configured to move in along only a single axis and the plate extruder 210 is configured such that it does not need to move at all to print onto a build platform. Likewise, less power is also needed in the illustrated line and plate extruders 110, 210 in comparison to present three-dimensional printing extruders. This is because in existing three-dimensional printing extruders, individual control at each nozzle is needed to heat each individual nozzle. A large amount of power is required to afford that individualized control. The present system only needs to control the application of current to a length of conductive elements, and thus less power is needed to provide this more generalized heating set-up. While existing three-dimensional printing systems required the control and power of $n^2$ nozzles, the three-dimensional printing systems and devices of the present disclosure only require the control and power of 2n nozzles, where n is the number of nozzles or apertures of the printing plate.

Figure 13A:
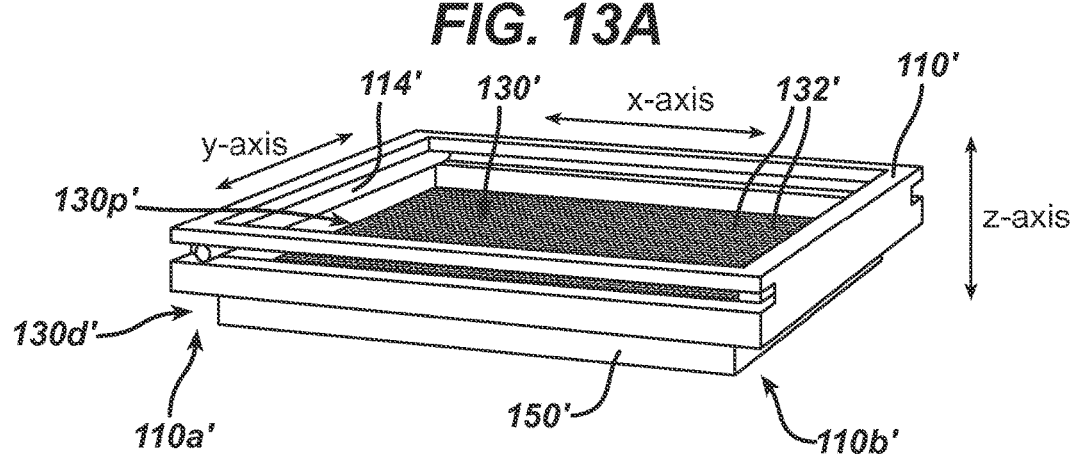
FIGS. 13A-13C are sequential, perspective view of another exemplary embodiment of a three-dimensional printing system, the system including a polymer coating wiper and a build platform that moves along a z-axis.
Figure 13B:
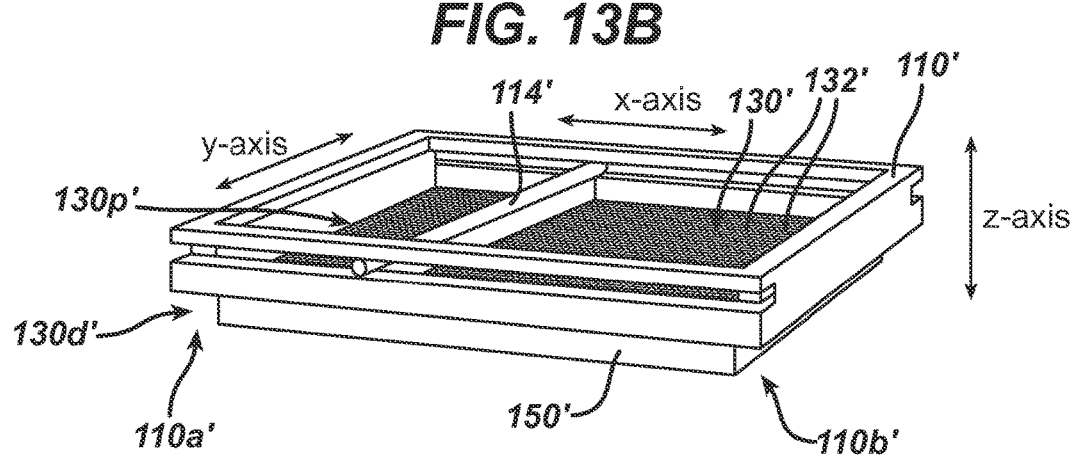
Figure 13C:
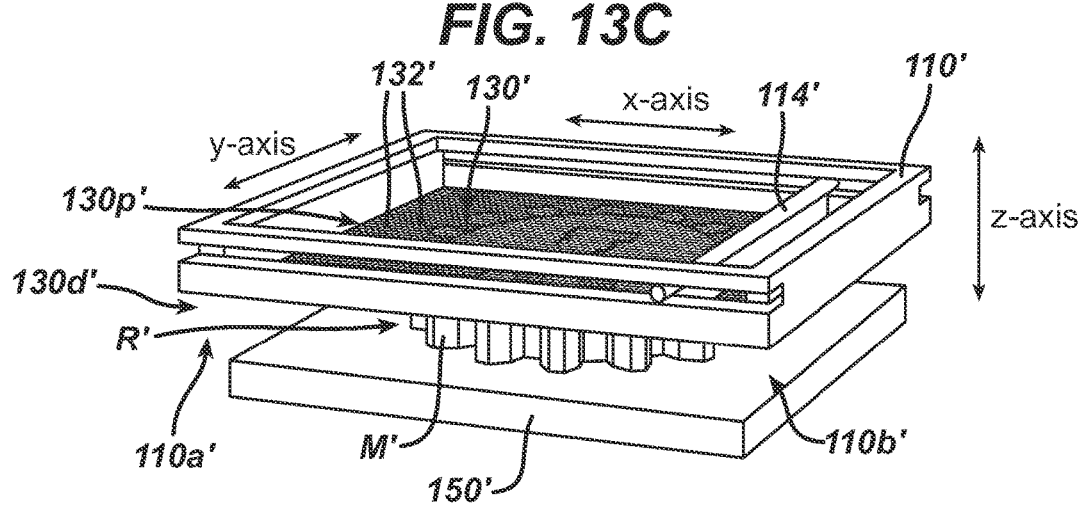

FIGS. 13A-13C illustrate another embodiment of a line extruder 110'. As shown, the extruder 110' includes a printing plate 130' disposed at a distal end 110d' of the extruder 110', the printing plate 130' having a plurality of apertures formed therein. The extruder 110' includes a wiper 114' extending along a y-axis and configured to move along an x-axis from a first end 110a' to a second end 110b' of the extruder 110'. A build platform 150' is disposed distal of the extruder 110' and is configured to receive material M' from the extruder 110'. The build platform 150' is configured to move relative to the extruder 110' along a z-axis, whether by the build platform 150' moving along the z-axis or the extruder 110' moving along the z-axis.

In use, a material M can be positioned in the extruder 110' such that it is located on a proximal side 130p' of the printing plate 130'. Conductive elements 132' of the printing plate 130' can have selectively have current applied thereto to activate them, thus heating selected locations of the plate 130'. Further, the wiper 114' can translate along the x-axis, for instance from the location illustrated in FIG. 13A to the location illustrated in FIG. 13B, to help push the material M through the apertures at the selected locations that are heated for deposition. The wiper 114' can complete its translation along the x-axis by going to the other side 110b', or it can return to the first side 110a' after it reaches the last selected location on the plate 130' for that layer. In alternative embodiments, the wiper 114' itself can include the material M' and can deposit the material M' onto the printing plate 130' as the wiper 114' translates along the x-axis. In still further alternative embodiments, the wiper 114' itself can heat the material M' to help deposit the material M' through the apertures of the printing plate 130'.

Once the layer is completed and cooled, the build platform 150' can move relative to the extruder 110' along the z-axis as shown in FIG. 13C and additional layers can be printed. This results in a three-dimensional object R' having a plurality of layers. Any known techniques for advancing either or both of the build platform 150' and the extruder 110' along the z-axis can be used, including but not limited to mechanical or electro-mechanical actuators that advance the build platform and/or the extruder a distance along the z-axis. In some embodiments, each layer can be printed by passing the wiper 114' from the first side 110a' to the second side 110b', while in other embodiments, each layer can alternate between passing from the first side 110a' to the second side 110b' and then passing from the second side 110b' to the first side 110a'. As described herein, the conductive elements 132' can be operated in a number of manners, including by performing sweeps or otherwise alternating which elements are active in order to achieve the desired print outcome while minimizing the number of unintended prints at non-selected locations. In some embodiments, this may involve performing multiple wipes in a single x-y coordinate plane to achieve the desired shape, which is still more efficient than existing, point-by-point printing systems.

Printing Plate Shifting

In some instances, it may be desirable to move a printing plate with respect to itself from layer to layer. For example, when an object to be printed includes a base that increases in size incrementally. As the size increases incrementally, support is needed to build upon the previous layer because the wider, taller layer must be supported in some fashion. This support may not be possible when the only printing locations are those defined by stationary nozzles of a stationary printing plate. Thus, it may be desirable to have interim selected locations that are not definable by a single aperture or nozzle of a stationary printing plate. In these instances, the printing plate can be configured to be moved to provide for even more selected locations than if the printing plate is stationary. Such movement can be achieved in a variety of ways, including, as described in greater detail below, by vibrating it, by linearly shifting it, and by rotating it. Other ways of moving a location of the printing plate with respect to the x-y coordinate plane are also possible.

Figure 14A:
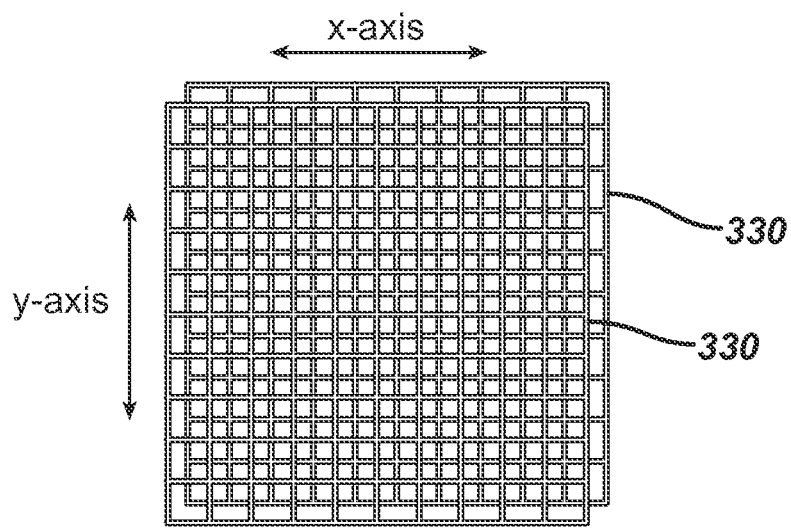
FIG. 14A is a schematic, top view of one exemplary embodiment of shifting a location of a printing plate between two layers.

As shown in FIG. 14A, in one embodiment a printing plate 330 can be linearly shifted or nudged a half step in either or both directions along the x and y-axes. The shift can be achieved by actuating one or more motors that advance the printing plate 330 incrementally in either or both directions. The same motor(s) can also be used to vibrate the printing plate 330 to help material pass through apertures of the printing plate. Vibration can also be used to achieve a linear shift.

Figure 14B:
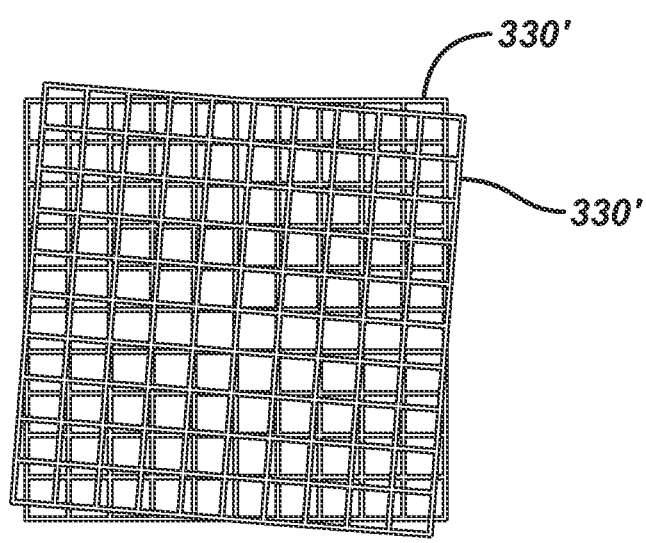
FIG. 14B is a schematic, top view of another exemplary embodiment of shifting a location of a printing plate between two layers.

In an alternative embodiment, shown in FIG. 14B, a printing plate 330' can be pivoted or rotated to an alternative location to provide additional location options for depositing material with respect to a build platform and the layers of the object already printed on the build platform. Motors or other known components can be operated to pivot or rotate the printing plate 330'. While the illustrated embodiments show the shifting occurring between two different layers, in some embodiments, it may be desirable to shift within the same layer to increase the printing locations in a single layer.

Coating a Printing Plate

Figure 15:
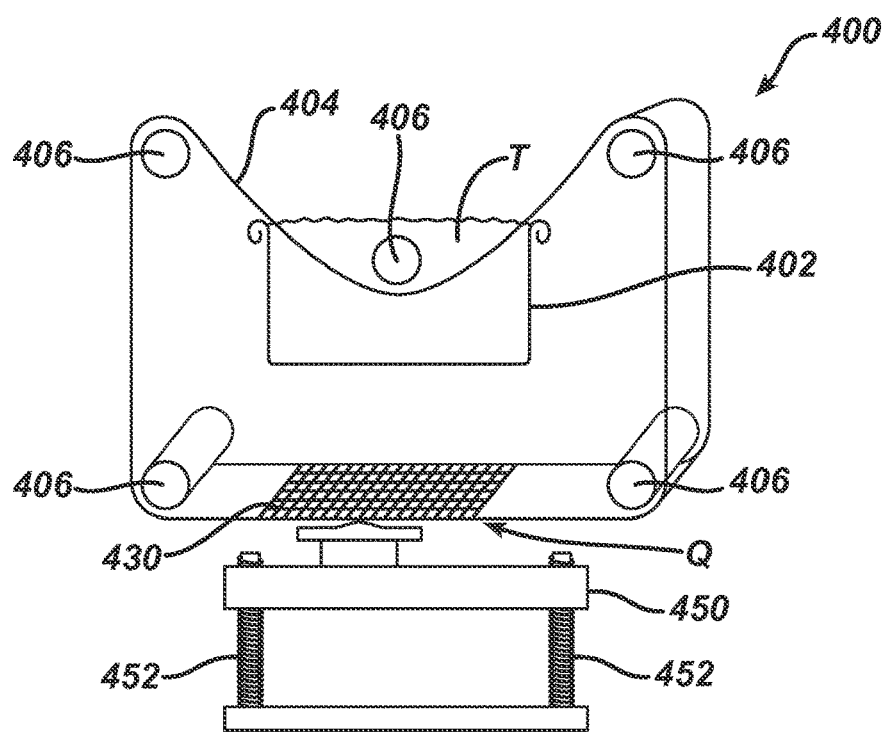
FIG. 15 is a perspective view of one exemplary embodiment of a system for coating a printing plate of a three-dimensional printing system.

As discussed above, in some embodiments it can be desirable for the conductive elements of the printing plate to be coated. The conductive elements can be coated at any time, including prior to, during, or after a printing process is performed. Further, it may be desirable to reapply coatings to the conductive elements during use because the coatings may wear off. The device 400 in FIG. 15 provides for one exemplary embodiment of a coating mechanism for applying a coating material to a printing plate 430.

As shown, the device 400 is disposed above a build platform 450 and includes a pool 402 of coating material T, a belt 404 on which the printing plate 430 is disposed, and a plurality of pulleys 406 configured to advance the belt 404 in a loop between the pool 402 and a position Q proximate to the build platform 450. Each time the printing plate 430 needs more coating, the pulleys 406 can pull the belt 404 around the loop to dispose the printing plate 430 in the pool 402 of coating material T, allowing the coating material T to be applied to the printing plate 430. The printing plate 430 can then rotate back to the position Q proximate to the build platform 450 for further use in printing layers onto the build platform 450. In other embodiments, the entire belt 404 can be a printing plate, and thus the printing plate can be continuously coated with the coating material T and used as desired. In the illustrated embodiment, a plurality of rotatable screws 452 are used to advance the build platform 450 along the z-axis, which illustrates one non-limiting way by which movement along the z-axis can be achieved by the build platform and or by the printing plate. In other embodiments, device 400 can be used to apply material to be deposited onto the build platform 450, for instance by providing the material to be printed in the pool 402. In other embodiments, a polymer-filled vessel can be used as a coating mechanism. For example, a vessel, e.g., a housing having a reservoir, can have a heated/liquid state polymer disposed within it. The polymer disposed in the vessel can be applied to a printing plate using a number of techniques, including but not limited using hydrostatic pressure or hydrostatic and external pressure sources to cause the polymer in the vessel to coat the printing plate without extruding through the printing plate. A person skilled in the art will recognize the amount of pressure to apply to provide for coating without causing the material to sag or deposit through apertures in the printing plate. Further, a person skilled in the art will recognize a variety of other ways and mechanisms that can be used to coat a printing plate.

Controller

Turning attention back to FIG. 1 momentarily, many of the printing steps provided for herein can be controlled by the controller 70 disposed on the printed circuit board 20. In the illustrated embodiment of FIG. 1, the controller 70 is an ATmega2560 microcontroller distributed by Arduino of Somerville, Mass., USA. A person skilled in the art will recognize how the controller 70 operates in conjunction with the remaining parts of the system in view of the present disclosures and knowledge of that person, and thus a detailed description of the same is unnecessary. Generally, the controller 70 can be used to control the application of current to the conductive elements of the printing plate 30, receive information and feedback about parameters of the system, including temperature measurements by the resistors 90, and adjust parameters of the system in response to the feedback based on pre-programmed responses associated with the controller 70. Alternatively, the feedback received by the controller 70 can be provided to a user, who can make adjustments to the system (e.g., adjusting a temperature supplied to a conductive element, a dwell time, or a cooling time) to respond to the elicited feedback. In some instances, the user can operate the tuning elements 80 to adjust one or more of the parameters provided for herein or otherwise known to those skilled in the art in view of the present disclosure. To the extent the controller 70 is configured to respond to various conditions of the system, a person having skill in the art will understand how to program the controller 70 as needed. In one exemplary embodiment, the controller 70 is fed instructions from a computer, based on a program and/or input from a user. For example, in some embodiments the controller 70 can provide feedback to a computer about temperature from the thermoresistors 90 and the computer can adjust parameters to improve the build quality and repeatability based on responses it has pre-programmed to respond to various conditions of the controller 70.

Alternative Embodiments for Supplying Print Material

Figure 16:
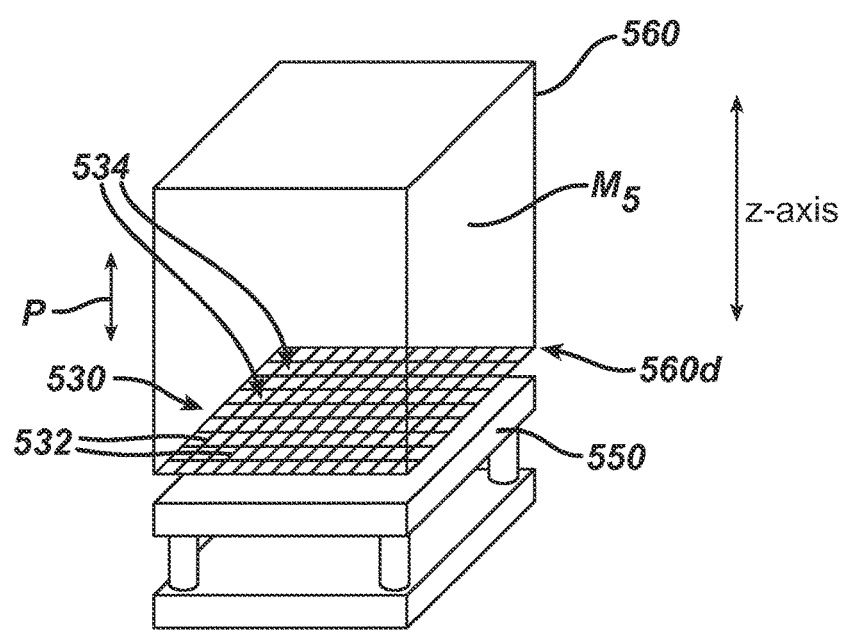
FIG. 16 is a perspective view of another exemplary embodiment of a three-dimensional printing system, the system including a pool of material for use in printing.

FIG. 16 provides another embodiment for providing material $M_5$ to a printing plate 530 for deposition onto a build platform 550. As shown, the material $M_5$ is disposed in a pool 560, and the printing plate 530 is disposed at a distal end 560d of the pool 560. The material $M_5$ can be configured such that in an unheated state it is in a phase that is not capable of passing through apertures 534 of the printing plate 530 when no pressure is applied to the material $M_5$. A layer can be printed by heating conductive elements 532 of the printing plate 530 as described herein and increasing a distance between the build platform 550 and the printing plate 530 along the z-axis using techniques described herein or otherwise known to those skilled in the art. Each layer can be subsequently printed by advancing the printing plate 530 along the z-axis in a proximal direction P through the pool 560, with the material $M_5$ being deposited onto the build platform 550 through selected locations, i.e., apertures 534, of the printing plate 530. Material $M_5$ that is not deposited as a layer as the printing plate continues to travel along the Z-axis may be skimmed away so as to maintain an approximately equal level of the pool 560. In other embodiments, the material disposed in the pool 560 can have a self-leveling property.

Figure 17:
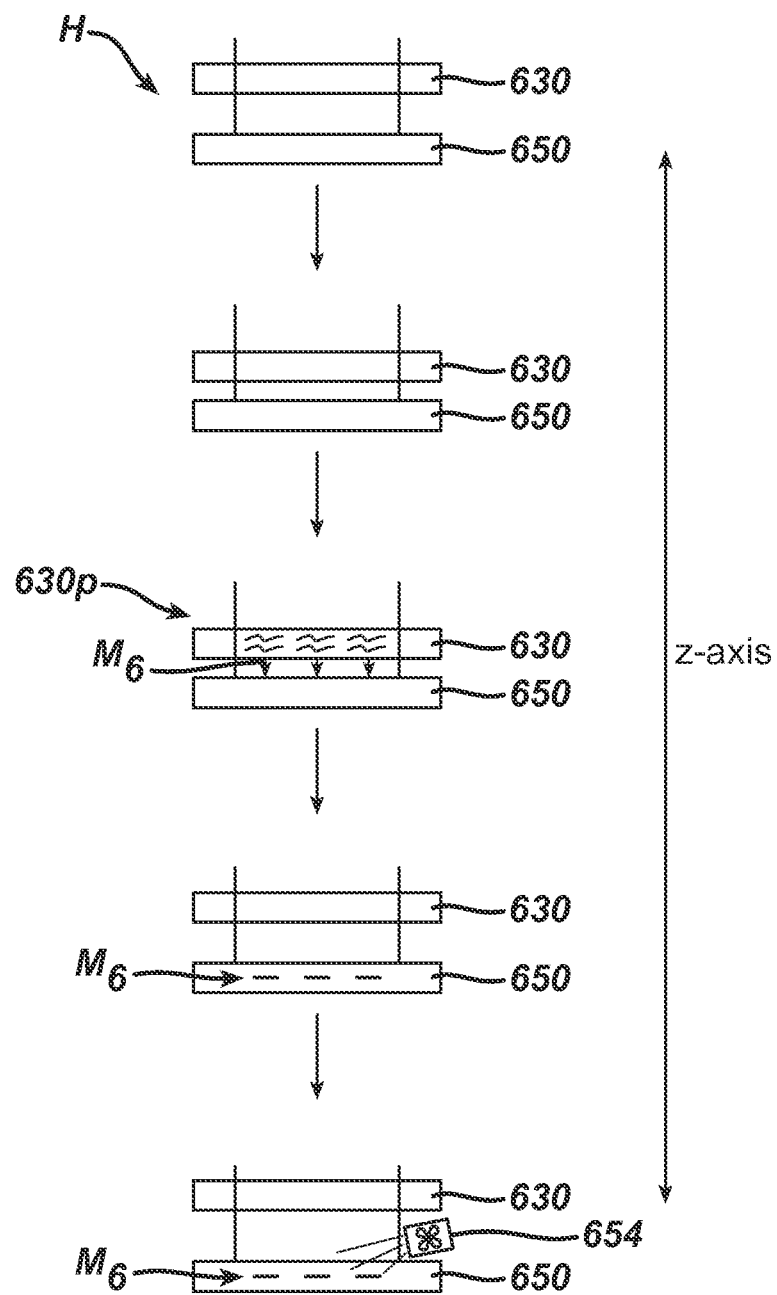
FIG. 17 is a schematic flow chart illustrating one exemplary embodiment of a method for printing a layer of a three-dimensional object.

A person skilled in the art will recognize a variety of different ways by which the printing methods can be performed in view of the disclosures provided. One exemplary embodiment of steps for printing are provided in FIG. 17, which provides for a schematic illustration of movement of a printing plate 630 with respect to a build platform 650 during an embodiment of a printing process. As shown, the printing plate 630 starts at a first, home position H, a distance away from the build platform 650. The distance between the plate and platform is subsequently reduced, for instance by advancing the printing plate 630 along a z-axis towards the build platform 650. Heat can then be supplied to conductive elements of the printing plate 630 using techniques as described herein to achieve the necessary threshold temperature at selected locations for printing. As a result, material $M_6$ disposed adjacent to a proximal side 630p of the printing plate 630 passes through apertures formed by the conductive elements of the printing plate 630 at selected locations and to the build platform 650. In some embodiments, either or both of the build platform 650 and the printing plate 630 can be moved, for instance by vibrating, to help the material $M_6$ pass through the selected apertures. Movement of the build platform 650 is typically only effective once contact is made by the material $M_6$ with the build platform 650. Once the layer has been deposited on the build platform 650, the distance between the printing plate 630 and build platform 650 can be increased, for instance by raising the printing plate 630 along the z-axis towards the home position H. The layer printed on the build platform 650 can be cooled, either by allowing it to sit and cool automatically or by using an instrument or mechanism to assist in cooling the material, such as a fan 654. The procedure can then be repeated to produce the next layer. Each layer can be built on top of each other until the desired three-dimensional object is fully achieved.

In order to facilitate a rapid transition between a flowable and non-flowable state of the material to be printed, the material can be maintained at a temperature that is near to, but below, the threshold temperature (sometimes referred to a neck region) of the material, i.e., the temperature at which the shear modulus drops rapidly. This material characteristic allows the material to be maintained just below the melting point without substantial fluid flow. When heat is modulated and increased, the reduced viscosity in the fluid allows the minimal force applied by gravity and/or hydrostatic pressure to form a convex meniscus. This meniscus forms below the printing plate and provides a raised surface capable of wetting a build platform for contact printing. After contact is made with the build platform, the heating source can be turned off, thereby returning the material to its initial temperature, which is below the melting point. This causes the viscosity of the remaining polymer to increase, and thus prevents further meniscus formation until the material can be replenished by recoating the printing plate or using some other method.

Alternative Embodiments of Printing Systems and Devices

Figure 18:
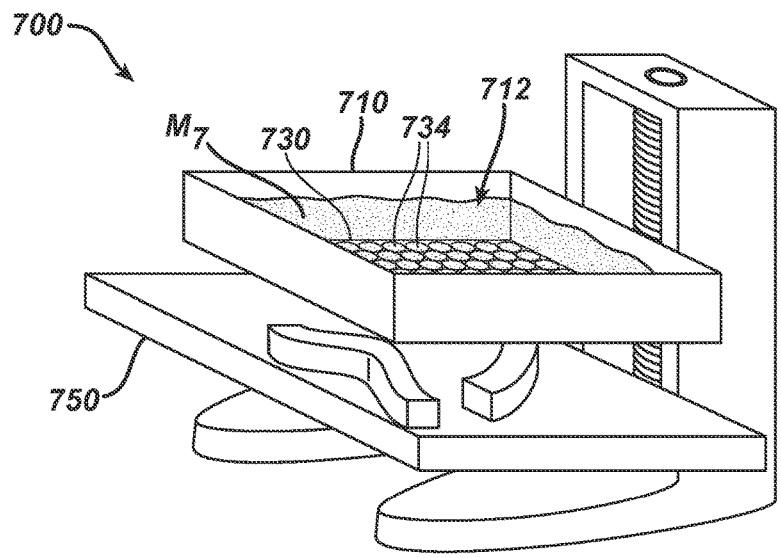
FIG. 18 is a perspective view of yet another exemplary embodiment of a three-dimensional printing system having a printing plate.
Figure 19:
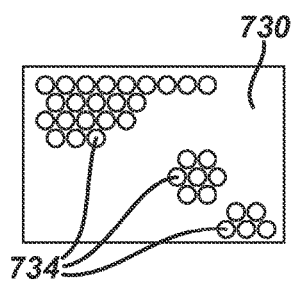
FIG. 19 is a bottom view of the printing plate of FIG. 18.
Figure 20:
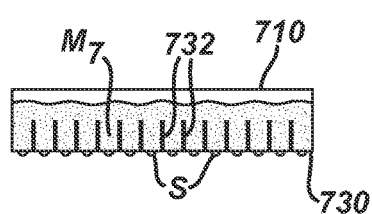
FIG. 20 is a cross-sectional side view of the printing plate of FIG. 18.

FIGS. 18-21 provide for an alternative embodiment of a three-dimensional printing system that can be used in conjunction with the present disclosures. While the present disclosure has primarily discussed printing in parallel in conjunction with FDM techniques, an alternative three-dimensional printing technique that can also be adapted for use in view of the present disclosures is Polyjet three-dimensional printing. FIG. 18 illustrates a microfluidic valve control set-up 700 akin to the Objet three-dimensional printer, which is distributed by Stratasys, Inc. of Eden Prairie, Minn. As shown, a printing plate 730 can be part of an extruder 710 disposed above a build platform 750, the plate 730 including a plurality of microvalves 734. The extruder 710 can be modified in view of the present disclosure to include a resin bath 712 of material $M_7$ for printing via the microvalves 734. The extruder 710 can also include a plurality of separating walls 732 formed therein that define the apertures or microvalves 734 through which the material $M_7$ can flow. The material $M_7$ can exit the extruder 710, via the plate 730, through the microvalves 734, causing a convex meniscus of fluid S to extend below each valve 734 before reaching the build platform 750 as shown.

Figure 21:
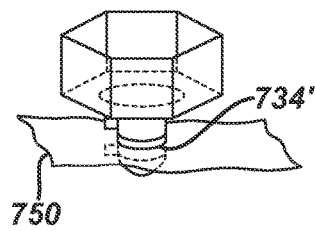
FIG. 21 is a perspective view of one exemplary embodiment of a nozzle that can be used in conjunction with the three-dimensional printing system of FIG. 18.

In alternative embodiments, the microvalves 734 provided for by Stratasys can be replaced by other valves or nozzles, such as those that may be more scalable for printing purposes, or apertures and nozzles as provided for in the present disclosure. A person skilled in the art could fabricate more scalable valves using lithographic processes, or by incorporating already known microvalve technologies, such as those derived from shape memory alloys, piezoelectric crystals, elastomer films, and electrorheological (ER) and magnetorheological (MR) fluids. One exemplary embodiment of a nozzle 734' that can be used in place of the microvalves 734 is illustrated in FIG. 21.

Figure 22:
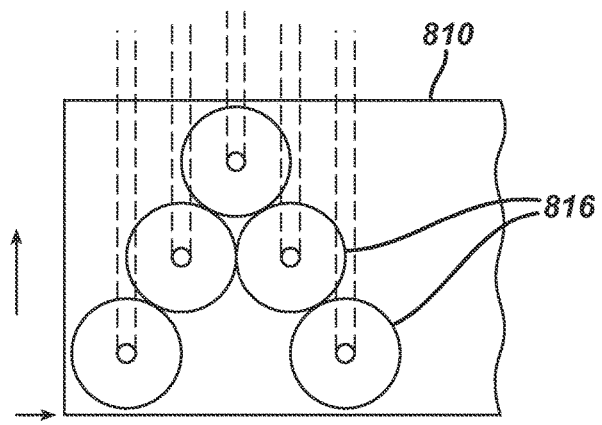
FIG. 22 is a side view of another exemplary embodiment of a three-dimensional printing system.
Figure 23:
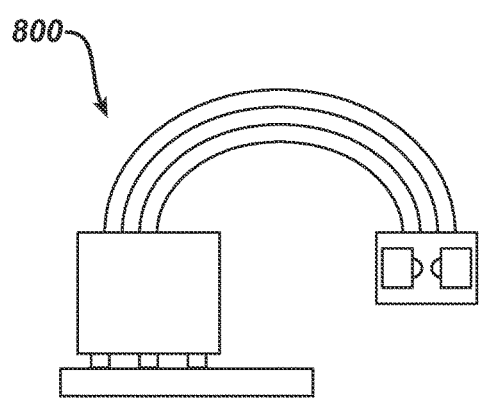
FIG. 23 is top view of an extruder of the three-dimensional printing system of FIG. 22.
Figure 24:
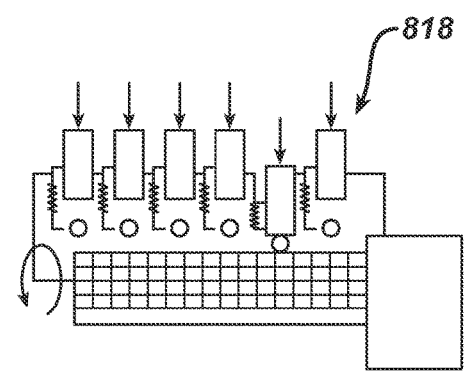
FIG. 24 is a cross-sectional side view of the three-dimensional printing system of FIG. 22.

FIGS. 22-24 provide another alternative embodiment of a three-dimensional printing system 800. As shown, a multi-nozzle extruder 810 is provided that is capable of advancing along an x-axis or a y-axis of a build platform in a manner similar to other extruders provided for in this disclosure. In the illustrated embodiment, the extruder 810 is a single-motor Bowden (remote) extruder that has pinch wheels 816 engaged by a cam system 818 commonly used in music boxes. Any number of pinch wheels 816 can be provided, depending, at least in part, on the size of the extruder 810 in which they are incorporated. In some embodiments, each wheel 816 can be engaged by a dedicated actuator, e.g., 9g servos or small linear actuators.

Figure 25:
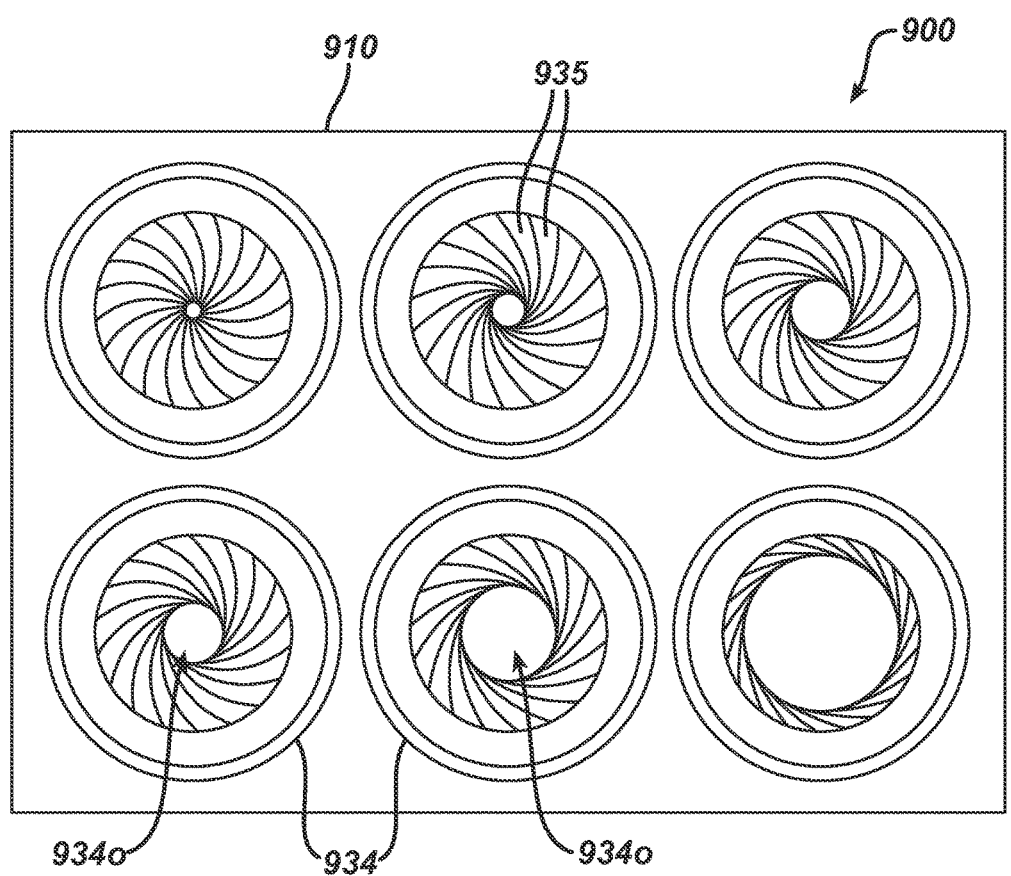
FIG. 25 is a bottom view of an exemplary embodiment of a three-dimensional printing system having a plurality of aperture extruders.

FIG. 25 provides yet another alternative embodiment of a three-dimensional printing system 900. In this system 900, the extruder 910 includes a plurality of apertures 934 located at distal ends of respective nozzles and that can be selectively controlled for material deposition. A size of openings 934o of the apertures 934 can be adjusted to adjust the size of the aperture through which printed material can pass. In the illustrated embodiment, the plurality of apertures 934 includes a set of quasi-trapezoidal plates 935 that form a spiral, similar to plates used in camera lenses. The plates 935 can be mechanically linked to a rotational element on an extruder head, and can be driven by a motor, such as the motor that drives material to be deposited through the extruder 910.

In another alternative embodiment, a ribbon extruder can be adapted for use in the parallel printing processes provided for in the present disclosure. For example, a ribbon extruder may include pneumatic or electromagnetically actuated fingers or blocking channels inside a ribbon extrusion. A person skilled in the art will recognize ways in which the present disclosures can be incorporated into a ribbon extruder without departing from the spirit of the present disclosure.

Figure 26:
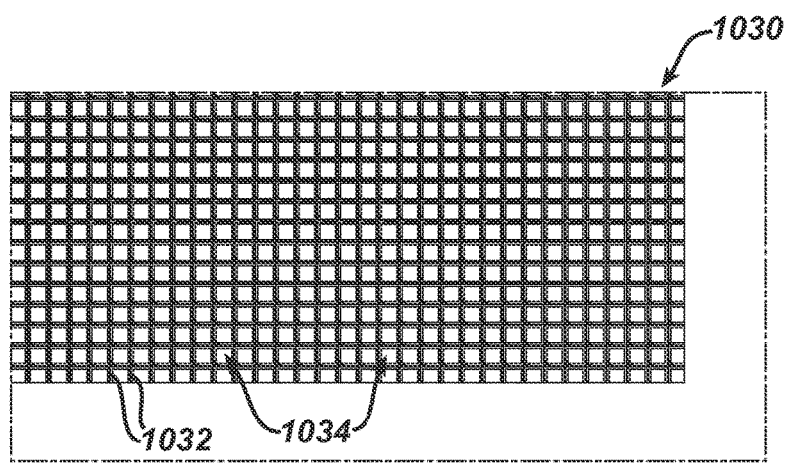
FIG. 26 is a top view of an exemplary embodiment of a printing plate for use in three-dimensional printing systems.
Figure 27:
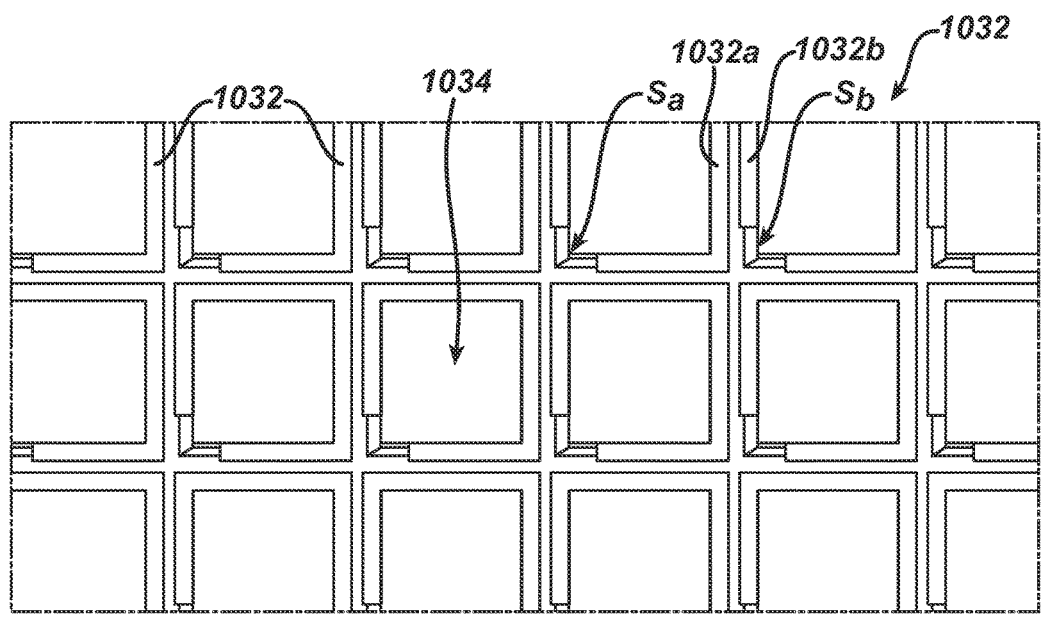
FIG. 27 is a detailed, top view of the printing plate of FIG. 26.

FIGS. 26 and 27 provide for yet a further embodiment of a three-dimensional printing system, and more specifically a printing plate 1030. The printing plate 1030 looks similar to the printing plates of previous embodiments, however, as shown in FIG. 27, the conductive elements 1032 do not extend a length of the printing plate. Instead, each aperture 1034 is defined by an individual conductive element, e.g., 1032a, 1032b, having a space $S_a$, $S_b$ formed therein that prevents the perimeter surrounding the aperture 1034 from being completed. Further, each conductive element 1032 is connected to ground. The result of this configuration is that each conductive element 1032 can be independently operated and all apertures or nozzles can be printed simultaneously for a single layer. Such a set-up reduces the need to run a sweep and/or other addressing schema designed to minimize inaccuracies that may occur when the printing is controlled by conductive elements that extend a length of the printing plate, with the current being supplied to either the entire length of the element or no length of the element at all.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method for printing in three dimensions, comprising:
   printing a first layer by depositing material in a plurality of locations within an x-y coordinate plane of a first vertical level through an extruder, wherein the extruder comprises a plurality of apertures defined between intersecting conductive elements; and
   printing a second layer that is disposed vertically above or below the first layer by depositing material in a plurality of locations within an x-y coordinate plane of a second vertical level through the extruder,
   wherein depositing the material in the plurality of locations within the x-y coordinate plane of the first vertical level or the second vertical level through the extruder comprises selectively heating a subset of the intersecting conductive elements to selectively heat a perimeter of a subset of the plurality of apertures to deposit the material at the plurality of locations within the x-y coordinate plane of the first vertical level or the second vertical level.

2. The method of claim 1,
   wherein printing the first layer further comprises controlling at least one of a viscosity of material and a temperature of material that is deposited such that the material passes through the subset of apertures present at the plurality of locations within the x-y coordinate plane of the first vertical level, and
   wherein printing the second layer further comprises controlling at least one of a viscosity of material and a temperature of material that is deposited such that the material passes through the subset of apertures present at the plurality of locations within the x-y coordinate plane of the second vertical level.

3. The method of claim 1, wherein printing the first layer by depositing material in the plurality of locations further comprises cycling a printing function between two or more locations of the plurality of locations to deposit the material within the x-y coordinate plane of the first vertical level.

4. The method of claim 1, wherein the extruder is a printing plate and the method further comprises moving the printing plate vertically along a z-axis prior to printing the second layer.

5. The method of claim 4, further comprising moving the printing plate with respect to one or both of the x-axis and the y-axis to establish the plurality of locations within the x-y coordinate plane at which the material is deposited for the second layer.

6. The method of claim 1, wherein printing the first layer further comprises advancing the extruder along only a single axis, either an x-axis or a y-axis, to deposit material in the plurality of locations within the x-y coordinate plane of the first vertical level.

7. The method of claim 1, wherein printing the first layer occurs without advancing the extruder through the x-y coordinate plane to deposit the material in the plurality of locations within the x-y coordinate plane of the first vertical level.

8. The method of claim 1, wherein the material deposited when printing the first layer and the material deposited when printing the second layer comprises a non-photocurable material.

9. The method of claim 1, wherein the material deposited when printing the first layer and the material deposited when printing the second layer comprises a thermoplastic.

10. A method for printing in three dimensions, comprising:
heating a material positioned proximate to one or more selected locations of a printing plate that has a plurality of apertures defined between intersecting conductive elements to pass the material through from one side of the plate to the other side of the plate to form a first printed layer; and
heating a material positioned proximate to one or more selected locations of the printing plate to pass a material through from one side of the plate to the other side of the plate to form a second printed layer, the second printed layer being disposed on top of the first printed layer,
wherein heating the material positioned proximate to the one or more selected locations of the printing plate to form the first printed layer or the second printed layer comprises selectively heating a subset of the intersecting conductive elements to selectively heat a perimeter of a subset of the plurality of apertures to pass the material through from the one side of the plate to the other side of the plate at the one or more selected locations of the printing plate.

11. The method of claim 10, wherein heating the material positioned proximate to the one or more selected locations of the printing plate to form the first printed layer further comprises supplying electrical current to the printing plate to heat the subset of the intersecting conductive elements that define the subset of apertures of the printing plate.

12. The method of claim 11, wherein the intersecting conductive elements comprise a plurality of first conductive elements disposed along a first axis that intersect with a plurality of second conductive elements disposed along a second axis that is substantially perpendicular to the first axis, and wherein supplying electrical current further comprises:
supplying electrical current to a subset of the first conductive elements to heat a perimeter of the subset of apertures along the first axis; and
supplying electrical current to a subset of the second conductive elements to heat a perimeter of the subset of apertures along the second axis.

13. The method of claim 12, further comprising cycling the supply of electrical current to one or more conductive elements of the subset of the first conductive elements and one or more conductive elements of the subset of the second conductive elements to control through which apertures the material passes.

14. The method of claim 10, further comprising moving the printing plate vertically along a z-axis prior to printing the second layer.

15. The method of claim 14, further comprising moving the printing plate with respect to one or both of an x-axis and a y-axis prior to printing the second layer.

16. The method of claim 10, wherein heating the material positioned proximate to the one or more selected locations of the printing plate to form the first printed layer further comprises applying a laser to the subset of the intersecting conductive elements to selectively heat the perimeter of the subset of apertures to pass the material from the one side of the plate to the other side of the plate.

17. The method of claim 10,
wherein heating the material positioned proximate to the one or more selected locations of the printing plate to form the first printed layer includes passing the material through the subset of apertures simultaneously, and
wherein heating the material positioned proximate to the one or more selected locations of the printing plate to form the second printed layer includes passing the material through the subset of apertures simultaneously.

18. A method for printing in three dimensions, comprising:
printing a first layer by near simultaneously depositing material in a plurality of selected locations within an x-y coordinate plane of a first vertical level through an extruder, wherein the extruder comprises a plurality of apertures defined between intersecting conductive elements; and
printing a second layer that is disposed vertically above or below the first layer by near simultaneously depositing material in a plurality of selected locations within an x-y coordinate plane of a second vertical level through the extruder,
wherein near simultaneously depositing the material in the plurality of selected locations within the x-y coordinate plane of the first vertical level or the second vertical level through the extruder comprises sequentially heating different subsets of the intersecting conductive elements to heat the perimeters of a subset of the plurality of apertures through which to deposit the material at the plurality of selected locations within the x-y coordinate plane of the first vertical level or the second vertical level, and wherein the different subsets of the intersecting conductive elements are sequentially heated to avoid depositing the material at a non-selected location within the x-y coordinate plane of the first vertical level or the second vertical level.

19. The method of claim 18, wherein each subset of the intersecting conductive elements does not intersect about a perimeter of a non-selected location within the x-y coordinate plane of the first vertical level or the second vertical level.

20. The method of claim 18, wherein the intersecting conductive elements comprise a plurality of first conductive elements disposed along a first axis that intersect with a plurality of second conductive elements disposed along a second axis that is substantially perpendicular to the first axis.

21. The method of claim 20, wherein near simultaneously depositing the material in the plurality of selected locations within the x-y coordinate plane of the first vertical level or the second vertical level through the extruder comprises:
   heating a subset of the first intersecting conductive elements; and
   sequentially heating different subsets of the second intersecting conductive elements, while continuing to heat the subset of the first intersecting conductive elements, to deposit the material at one of more of the selected locations within the x-y coordinate plane of the first vertical level or the second vertical level.

22. The method of claim 21, wherein heating each of the different subsets of the second intersecting conductive elements along with the subset of the first intersecting conductive elements does not heat a perimeter of a non-selected location within the x-y coordinate plane of the first vertical level or the second vertical level.

23. The method of claim 20, wherein near simultaneously depositing the material in the plurality of selected locations within the x-y coordinate plane of the first vertical level or the second vertical level through the extruder comprises:
   heating a subset of the second intersecting conductive elements; and
   sequentially heating different subsets of the first intersecting conductive elements, while continuing to heat the subset of the second intersecting conductive elements, to deposit the material at one of more of the selected locations within the x-y coordinate plane of the first vertical level or the second vertical level.

24. The method of claim 23, wherein heating each of the different subsets of the first intersecting conductive elements along with the subset of the first intersecting conductive elements does not heat a perimeter of a non-selected location within the x-y coordinate plane of the first vertical level or the second vertical level.

25. The method of claim 18, wherein sequentially heating the different subsets of the intersecting conductive elements to heat the perimeters of a subset of apertures through which to deposit the material at the plurality of selected locations within the x-y coordinate plane of the first vertical level or the second vertical level comprises sequentially supplying electrical current to the different subsets of the intersecting conductive elements.

\* \* \* \* \*